(12) United States Patent
Tsuda et al.

(10) Patent No.: US 11,350,751 B2
(45) Date of Patent: Jun. 7, 2022

(54) TACTILE PRESENTATION DEVICE

(71) Applicant: SONY CORPORATION, Tokyo (JP)

(72) Inventors: Takamoto Tsuda, Nagano (JP); Yusuke Otani, Kanagawa (JP); Ikuo Yamano, Tokyo (JP); Osamu Ito, Tokyo (JP); Ryo Yokoyama, Tokyo (JP); Takeshi Ogita, Tokyo (JP); Yohei Fukuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/059,358

(22) PCT Filed: Mar. 29, 2019

(86) PCT No.: PCT/JP2019/013939
§ 371 (c)(1),
(2) Date: Nov. 27, 2020

(87) PCT Pub. No.: WO2019/239678
PCT Pub. Date: Dec. 19, 2019

(65) Prior Publication Data
US 2021/0235871 A1    Aug. 5, 2021

(30) Foreign Application Priority Data

Jun. 13, 2018  (JP) .............................. JP2018-112895
Sep. 11, 2018  (JP) .............................. JP2018-169474

(51) Int. Cl.
*A47C 1/12*       (2006.01)
*A44B 11/00*    (2006.01)
(Continued)

(52) U.S. Cl.
CPC .............. *A47C 1/12* (2013.01); *A44B 11/005* (2013.01); *A45F 3/04* (2013.01); *A47C 7/425* (2013.01);
(Continued)

(58) Field of Classification Search
CPC .. A47C 1/12; A47C 7/425; A47C 7/62; A47C 7/72; A45F 3/04; A44B 11/005; B65D 65/38; G06F 3/011
(Continued)

(56) References Cited

U.S. PATENT DOCUMENTS

2001/0012921 A1   8/2001  Zicherman
2002/0145512 A1  10/2002 Sleichter, III et al.
2018/0206646 A1* 7/2018  Breibart ................. A47C 7/425

FOREIGN PATENT DOCUMENTS

JP    H10-507121 A    7/1998
JP    2003-284752 A  10/2003
(Continued)

*Primary Examiner* — Mark R Wendell
(74) *Attorney, Agent, or Firm* — Paratus Law Group, PLLC

(57) ABSTRACT

There is provided a tactile presentation device capable of realizing easier wearing/removal and contact of a tactile stimulation unit in an appropriate position. The tactile presentation device is provided with an attaching unit to a back plate of a chair, and a wearing belt portion to a body provided so as to be extendable and contractable on the attaching unit, in which one or more first tactile stimulation units are provided on the attaching unit, and one or more second tactile stimulation units are provided on the wearing belt portion.

13 Claims, 29 Drawing Sheets

(51) Int. Cl.
  *A45F 3/04*   (2006.01)
  *A47C 7/72*   (2006.01)
  *B65D 65/38*  (2006.01)
  *G06F 3/01*   (2006.01)
  *A47C 7/42*   (2006.01)
  *A47C 7/62*   (2006.01)

(52) U.S. Cl.
  CPC .................. *A47C 7/62* (2013.01); *A47C 7/72* (2013.01); *B65D 65/38* (2013.01); *G06F 3/011* (2013.01)

(58) Field of Classification Search
  USPC ....................................................... 297/217.3
  See application file for complete search history.

(56) References Cited

FOREIGN PATENT DOCUMENTS

| | | |
|---|---|---|
| JP | 3107325 U | 2/2005 |
| JP | 2018-060313 A | 4/2018 |
| WO | WO 2018/092595 A1 | 5/2018 |

* cited by examiner

TACTILE PRESENTATION DEVICE

CROSS REFERENCE TO PRIOR APPLICATION

This application is a National Stage Patent Application of PCT International Patent Application No. PCT/JP2019/013939 (filed on Mar. 29, 2019) under 35 U.S.C. § 371, which claims priority to Japanese Patent Application Nos. 2018-112895 (filed on Jun. 13, 2018) and 2018-169474 (filed on Sep. 11, 2018), which are all hereby incorporated by reference in their entirety.

TECHNICAL FIELD

The present disclosure relates to a tactile presentation device.

BACKGROUND ART

In recent years, a so-called 4D experience in which a seat moves or vibrates is provided as a technology of adding a tactile expression to a movie or stage experience.

Regarding a technology of adding the tactile expression, for example, following Patent Document 1 discloses a clothing type tactile presentation device. In a case of the clothing type tactile presentation device, it is possible to present vibration that cannot be directly transmitted to the body by a seat.

CITATION LIST

Patent Document

Patent Document 1: Japanese Patent Application Laid-Open No. 2018-60313

SUMMARY OF THE INVENTION

Problems to be Solved by the Invention

However, in a case of a wearable presentation device such as a jacket, a vibration device cannot be applied to an efficient site in terms of tactile experience unless this is appropriately worn, which requires a time and labor cost when wearing. For example, there has been a case where staff help is essential.

Therefore, the present disclosure suggests a tactile presentation device capable of realizing easier wearing/removal and contact of a tactile stimulation unit in an appropriate position.

Solutions to Problems

According to the present disclosure, suggested is a tactile presentation device provided with an attaching unit to a back plate of a chair, and a wearing belt portion to a body provided so as to be extendable and contractable on the attaching unit, in which one or more first tactile stimulation units are provided on the attaching unit, and one or more second tactile stimulation units are provided on the wearing belt portion.

According to the present disclosure, suggested is tactile presentation device provided with a seating face, a back plate, a wearing belt portion to a body provided so as to be extendable and contractable on the back plate, and a back surface member arranged on a front surface of the back plate, in which one or more first tactile stimulation units are provided on the back surface member arranged on the front surface of the back plate, and one or more second tactile stimulation units are provided on the wearing belt portion.

Effects of the Invention

As described above, according to the present disclosure, it is possible to realize easier wearing/removal and contact of the tactile stimulation unit in an appropriate position.

Note that, the effect described above is not necessarily limited, and it is also possible to obtain any one of the effects described in this specification or another effect which may be grasped from this specification together with or in place of the effect described above.

MODE FOR CARRYING OUT THE INVENTION

Figure 1:
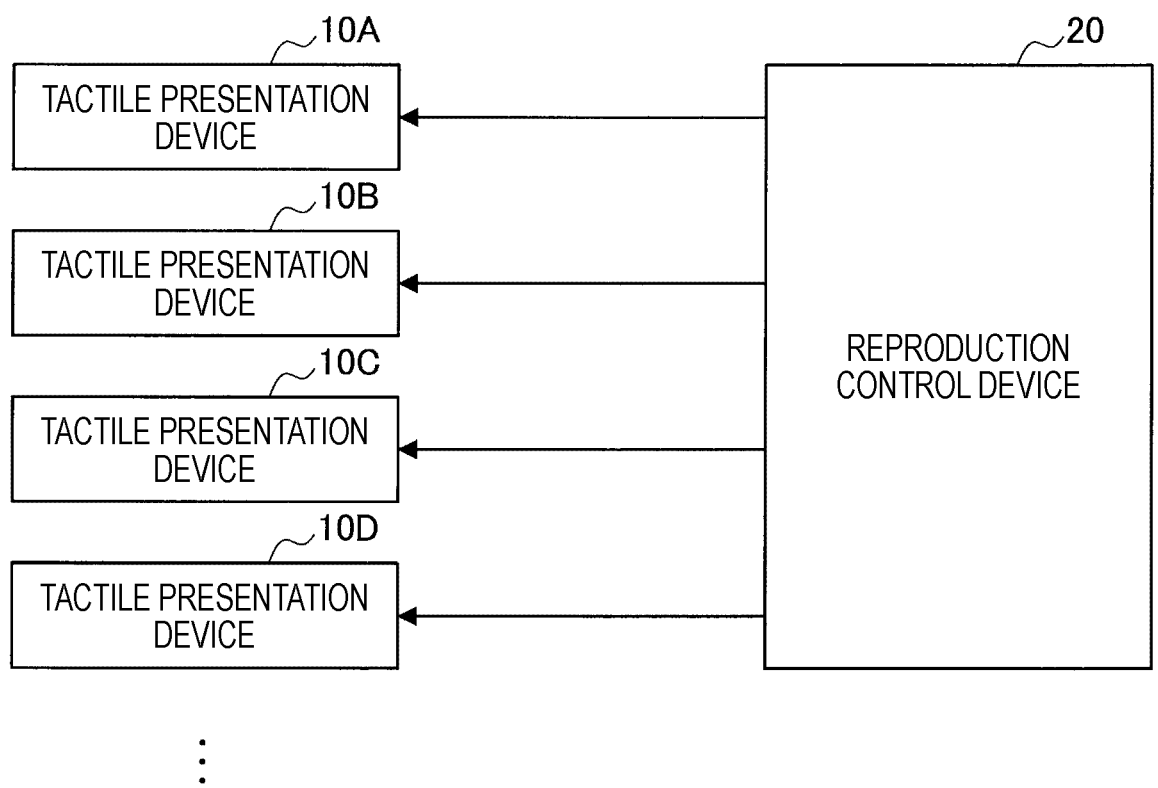
FIG. 1 is a view for explaining an overall configuration example of a tactile presentation system according to one embodiment of the present disclosure.

A preferred embodiment of the present disclosure is hereinafter described in detail with reference to the accompanying drawings. Note that, in this specification and the drawings, the components having substantially the same functional configuration are assigned with the same reference sign and the description thereof is not repeated.

Furthermore, the description is given in the following order.

1. Outline of tactile presentation device according to one embodiment of present disclosure
2. Configuration example
2-1. System configuration
2-2. Internal configuration
2-3. External configuration
3. Operation processing
4. Six-sided views of tactile presentation device
5. Variation
5-1. Device of adhesion of tactile stimulation unit to body
(5-1-1. Usage of elastically deformable member)
(5-1-2. Usage of materials with different elasticity)
(5-1-3. Usage of fixture)
(5-1-4. Contact area of vibration device with body)
5-2. Vibration control according to attaching/detaching state of buckle
5-3. Adhesion of belt on shoulder
(5-3-1. Example of allowing wearing belt to penetrate through chair)
(5-3-2. Example of allowing wearing belt to penetrate through back surface pad)
5-4. Combination of three-point safety belt
(5-4-1. Example of combining two three-point safety belt)
(5-4-2. Example of flipping one three-point safety belt vertically)
(5-4-3. Example of combining three-point safety belt and two-point safety belt)
(5-4-4. Example of adjusting position of tactile stimulation unit according to body type)
(5-4-5. Regarding position of attaching/detaching buckle arranged on side of body)
5-5. Configuration example in which position of tactile stimulation unit may be adjusted
5-6. Another configuration example of tactile presentation device
5-7. Another configuration example of tactile presentation device
6. Summary «1. Outline of Tactile Presentation Device According to One Embodiment of Present Disclosure»

First, an outline of a tactile presentation device according to one embodiment of the present disclosure is described. The tactile presentation device according to this embodiment includes an extendable/contractable wearing belt, and the wearing belt is provided with a tactile stimulation unit (for example, an actuator that generates vibration).

The wearing belt is pulled out from a winding unit (winding mechanism), and may be worn by a user himself/herself as a safety belt or a child seat of a popularized vehicle. By wearing the wearing belt, the tactile stimulation unit provided on the wearing belt touches a roughly appropriate site of a body of the user at an appropriate pressure due to tension of the wearing belt, which reduces a time and labor cost of wearing.

In a case of a jacket type tactile presentation device as described above, it is necessary to appropriately wear a large number of belts (such as Velcro (registered trademark) type) for tightening the jacket, for example; however, it has been difficult for the user to find an appropriate degree of tightening, so that a help by a staff and the like has been essential. In contrast, in the tactile presentation device according to one embodiment of the present disclosure, by installing one or more tactile stimulation units on the wearing belt, the user may easily wear the same by himself/herself, and the tactile stimulation unit touches the appropriate site of the body of the user. Furthermore, it becomes possible to press the tactile stimulation unit against the body of the user at the appropriate pressure by the tension of the wearing belt (assuming in advance the pressure on the body of the user when the belt is worn, output intensity and the like from the tactile stimulation unit may be adjusted).

Furthermore, the tactile presentation device according to this embodiment may also have a configuration in which the tactile stimulation unit is provided on a back plate side of a chair. This makes it possible to present a tactile stimulus principally from the back of the body of the user.

Furthermore, the tactile presentation device according to this embodiment may include a tactile stimulation unit (first tactile stimulation unit) provided on the back plate side of the chair and a tactile stimulation unit (second tactile stimulation unit) provided on the wearing belt, and perform control to link tactile stimulus outputs from the first and second tactile stimulation units. Therefore, it becomes possible to allow the user to perceive a tactile effect in the body of the user and that passing through the inside of the body.

Here, in a case where each of a plurality of tactile stimulation units independently generates vibration, the generated vibration is perceived only in the periphery of the tactile stimulation unit. In contrast, an illusion phenomenon referred to as phantom sensation is medically clarified. This phantom sensation is the illusion phenomenon that, when stimuli are simultaneously presented to different positions on the skin, a human perceives only one stimulus between the presented stimulus positions. For example, it is known that, when two tactile stimulation units arranged on the body of the user are allowed to simultaneously output the stimuli, a position of the stimulus perceived by the user (hereinafter, referred to as a perceptual position) is a position between the two tactile stimulation units in general. Here, assume at the output intensity of one tactile stimulation unit is continuously decreased as, for example, "1", "0.6", "0", and the output intensity of the other tactile stimulation unit is continuous increased as "0", "0.6", "1" over time. In this case, the perceptual position (perceived by the user) may continuously move from a contact position of one tactile stimulation unit to the contact position of the other tactile stimulation unit. By changing the output intensity of the plurality of tactile stimulation units in this manner, a range of the tactile stimuli that may be presented by the plurality of tactile stimulation units may be continuously expanded without changing arranging intervals of the tactile stimulation units.

Such continuous movement of the perceptual position is not limited to the surface of the body, and the perceptual position may pass through the inside of the body in a case where two tactile stimulation units are located across the body. That is, the perceptual position may move from a first surface of the body, which is a contact surface of one tactile stimulation unit, to the inside of the body, and to a second surface of the body, which is a contact surface of the other tactile stimulation unit (the second surface facing the first surface). In this embodiment, the two tactile stimulation units located across the body may correspond to, for example, the first tactile stimulation unit provided on the back plate side of the chair and the second tactile stimulation unit provided on the wearing belt described above. The tactile presentation device according to this embodiment may allow the user to perceive the tactile effect not only on the surface of the body but also in the body by linking the first tactile stimulation unit provided on the back plate side of the chair and the second tactile stimulation unit provided on the wearing belt. By feeling the tactile stimulus also in the body, an effect of stimulating feelings to move not only the body but also the heart may be expected.

Furthermore, the first tactile stimulation unit provided on the back plate side of the chair and the second tactile stimulation unit provided on the wearing belt may be arranged so as to make a pair across the body of the user (so as to face across the body of the user) when the wearing belt is worn.

The outline of the tactile presentation device according to this embodiment is described above. The tactile presentation device according to this embodiment has at least a part of the configurations described above.

Furthermore, the tactile presentation device according to this embodiment may be configured to be attachable to/detachable from an existing chair such as a spectator's seat of movie, stage and the like, a chair at home or the like, and may be realized as a chair itself having the configurations described above.

In a case of the configuration that may be attached to/detached from the existing chair, it is possible to provide a tactile stimulus experience according to this embodiment by simply attaching the tactile presentation device to the back plate portion without modifying or damaging the existing chair.

«2. Configuration Example»

<2-1. System Configuration>

Subsequently, an example of a tactile presentation system using the tactile presentation device according to this embodiment is specifically described with reference to the drawings. FIG. 1 is a view for explaining an overall configuration example of the tactile presentation system according to this embodiment.

As illustrated in FIG. 1, each of a plurality of tactile presentation devices 10 (10A to 10D . . . ) provided on each chair outputs the tactile stimulus from the tactile stimulation unit according to control by a reproduction control device 20 (for example, a server, a PC, a tablet terminal, a smartphone and the like). A situation in which the plurality of tactile presentation devices 10 is provided on, for example, the spectator's seats of movie, stage and the like is assumed. The reproduction control device 20 delivers a control signal (vibration pattern, output intensity and the like) of the tactile stimulus at a timing according to progress of the movie or stage (an example of other contents provided to the user together with the tactile stimulus; various media contents such as video, music, still image and the like are assumed). A communication system of the control signal is not especially limited; this is transmitted from the reproduction control device 20 to the tactile presentation device 10 by wire or wirelessly, for example. Furthermore, a format of the control signal is also not especially limited; this may be, for example, data for channels of a plurality of tactile stimulation units provided on each tactile presentation device 10 or may be a command system.

<2-2. Internal Configuration>

Figure 2:
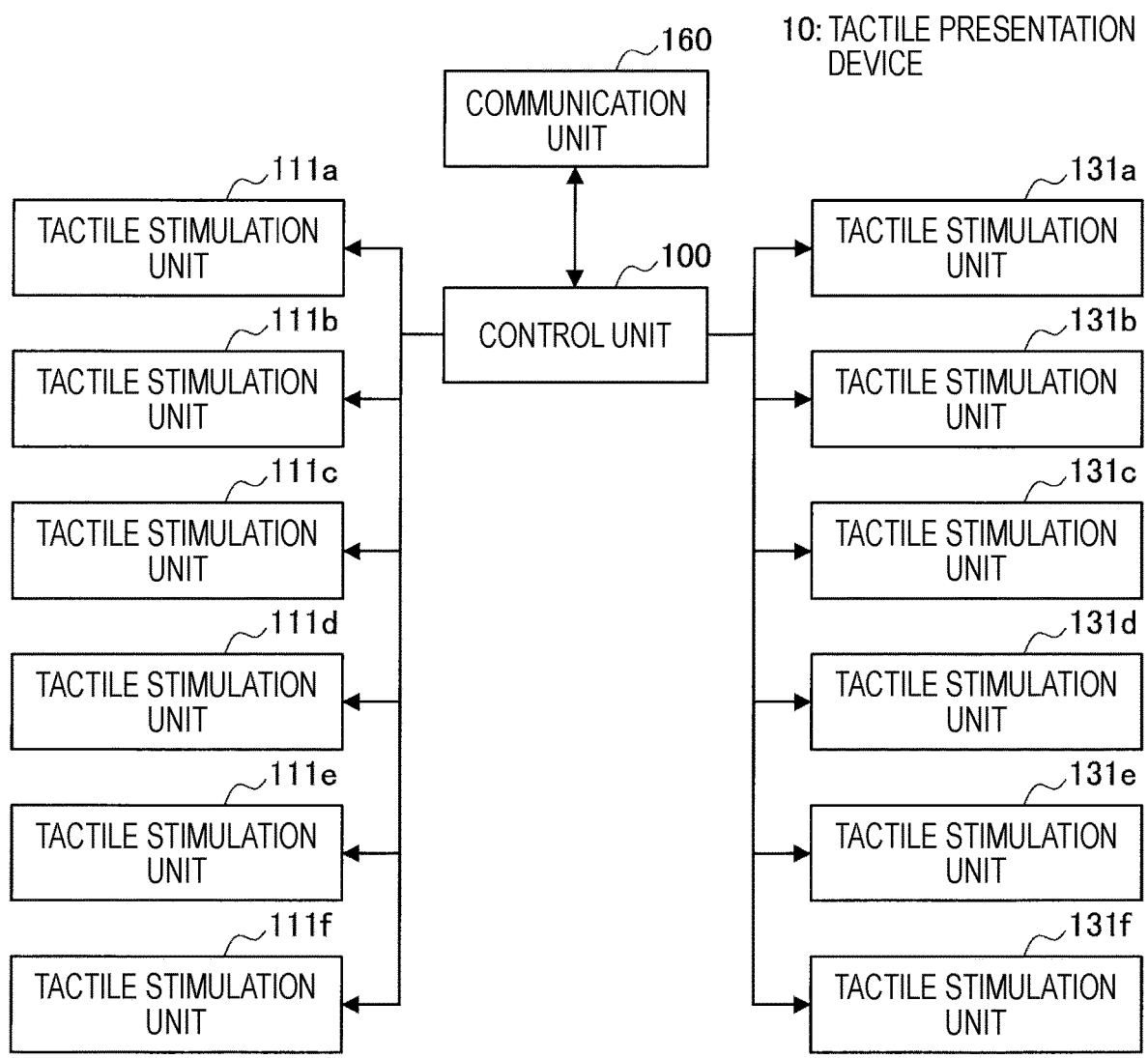
FIG. 2 is a block diagram illustrating an internal configuration example of the tactile presentation device according to this embodiment.

FIG. 2 is a block diagram illustrating an internal configuration example of the tactile presentation device 10 according to this embodiment. As illustrated in FIG. 2, the tactile presentation device 10 includes a control unit 100, a communication unit 160, a tactile stimulation unit 111, and a tactile stimulation unit 131.

(Control Unit 100)

The control unit 100 serves as an arithmetic processing device and a control device, and controls overall operations in the tactile presentation device 10 according to various programs. The control unit 100 is realized by an electronic circuit such as a central processing unit (CPU) and a microprocessor, for example. Furthermore, the control unit 100 may include a read only memory (ROM) that stores the programs to be used, arithmetic parameters and the like, and a random access memory (RAM) that temporarily stores parameters and the like that appropriately change.

For example, the control unit 100 performs output control of the tactile stimuli of the tactile stimulation unit 111 and the tactile stimulation unit 131 according to the control signal received from the reproduction control device 20.

(Communication Unit 160)

The communication unit 160 may connect to an external device by wire or wirelessly and transmit/receive data. For example, the communication unit 160 communicates with/connects to the reproduction control device 20 to receive the control signal by a wired/wireless local area network (LAN), Wi-Fi (registered trademark), Bluetooth (registered trademark), a mobile communication network (long term evolution (LTE) and third-generation mobile communication system (3G)) or the like.

(Tactile Stimulation Unit 111, Tactile Stimulation Unit 131)

The tactile stimulation unit 111 and the tactile stimulation unit 131 have a function of outputting the tactile stimulus. For example, the tactile stimulation 111 and the tactile stimulation unit 131 are realized by an actuator (vibration device) that outputs vibration as an example of the tactile stimulus. The vibration device does not depend on this system, and various types are available. For example, this may be a voice coil motor (VCM) system vibration device.

Note that tactile stimulation units 111 (111a to 111f) correspond to the first tactile stimulation unit provided on the back plate side, and the tactile stimulation units 131 (131a to 131f) correspond to the second tactile stimulation unit provided on the wearing belt as described later with reference to FIG. 3. A plurality of tactile stimulation units 111a to 111f and tactile stimulation units 131a to 131f may also be realized by vibration devices of different types.

The configuration of the tactile presentation device 10 according to this embodiment is specifically described above. Note that the configuration of the tactile presentation device 10 is not limited to the example illustrated in FIG. 2. Although not illustrated, the tactile presentation device 10 may include a storage unit. The storage unit may be realized by a read only memory (ROM) that stores the programs to be used in processing of the control unit 100, the arithmetic parameters and the like, and a random access memory (RAM) that temporarily stores the parameters and the like that appropriately change. Furthermore, the tactile presentation device 10 may include various sensors such as a biosensor, a microphone, and a vibration sensor. Furthermore, the tactile presentation device 10 may further include a presentation unit that presents the tactile stimulus other than vibration.

<2-3. External Configuration>

Subsequently, an external configuration of the tactile presentation device 10 according to this embodiment is described with reference to FIG. 3. As an example, the tactile presentation device 10 illustrated in FIG. 3 has a structure attachable to/detachable from the back plate portion of the existing chair.

Figure 3:
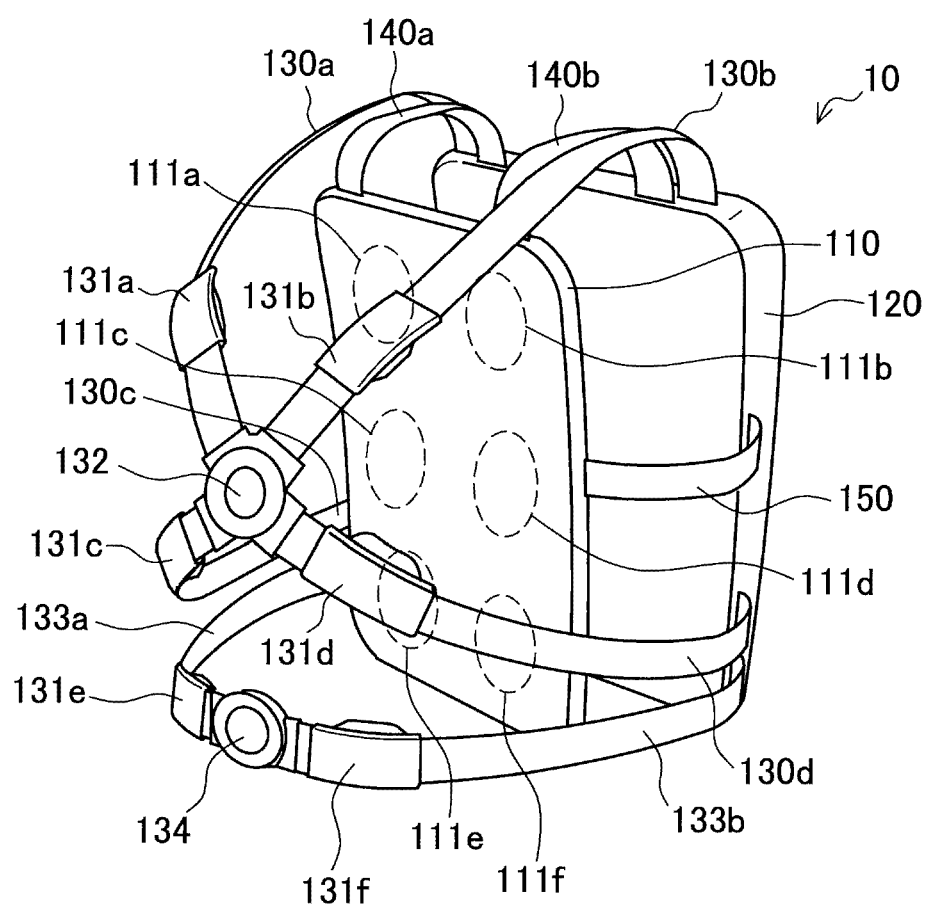
FIG. 3 is a view illustrating an external configuration example of the tactile presentation device according to this embodiment.

As illustrated in FIG. 3, the tactile presentation device 10 includes a back surface plate 120 and a back surface pad 110 (an example of a back surface member) as an attaching unit to the chair. The tactile presentation device 10 is mounted on the existing chair, for example, by interposing the back plate (backrest) portion of the existing chair by the back surface plate 120 and the back surface pad 110. Therefore, the tactile presentation device 10 may be installed without modifying or damaging the existing chair. Note that a fixing belt 150 that connects the back surface plate 120 and the back surface pad 110 may be provided on a right side and a left side. By the fixing belts 150, the back surface plate 120 and the back surface pad 110 may be fixed to the chair, and it becomes possible to respond to the back plates of various heat.

Furthermore, the back surface pad 110 is provided with the plurality of tactile stimulation units 111 (111a to 111f). The tactile stimulation unit 111 corresponds to the first tactile stimulation unit provided on the back plate side according to this embodiment.

Furthermore, wearing belts 130a, 130b, 130c, 130d, 133a, and 133b are provided so as to be pulled out from the back surface plate 120. The number of wearing belts is not especially limited. Each wearing belt may be pulled out from each winding unit 102 (refer to FIG. 6) provided inside the back surface plate 120.

Figure 4:
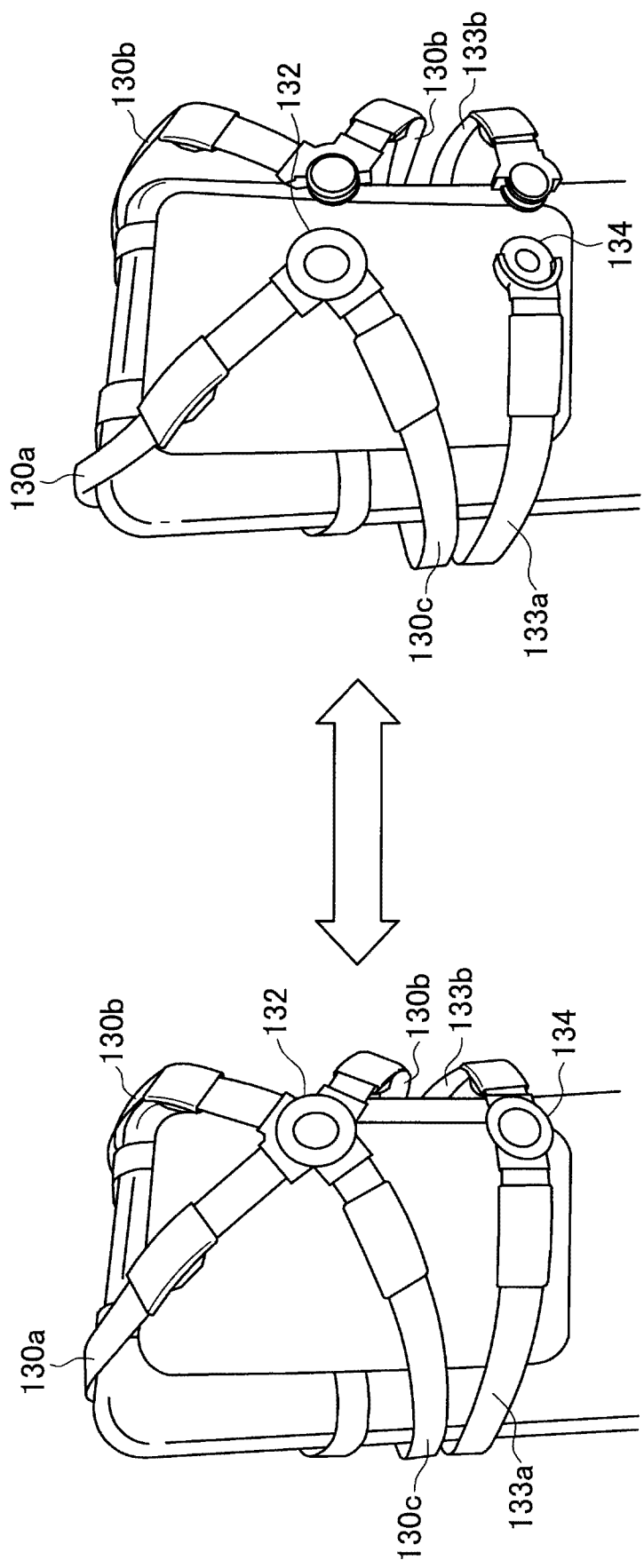
FIG. 4 is a view for explaining wearing/removal of a wearing belt of the tactile presentation device according to this embodiment.

Each wearing belt is fixed by attaching/detaching buckles 132 and 134 in front. FIG. 4 is a view for explaining wearing/removal of the wearing belt of the tactile presentation device 10 according to this embodiment. As illustrated in FIG. 4, for example, the attaching/detaching buckle 132 fixes the wearing belts 130a and 130c and the wearing belts 130b and 130d, and the attaching/detaching buckle 134 fixes the wearing belt 133a and the wearing belt 133b. The attaching/detaching buckle 132 is located at roughly the center of chest of the body of a restrained user, and the attaching/detaching buckle 134 is located at roughly the center of abdomen (umbilical portion) of the body of the restrained user. A method of detaching the attaching/detaching buckles 132 and 134 is not especially limited, but it is possible to detach as illustrated in a right side of FIG. 4 by pressing a button at the center of the buckle, for example.

Furthermore, the wearing belts 130a, 130b, 130c, and 130d are provided so as to restrain the front of the user's chest in an X-shape centering on the attaching/detaching buckle 132. More specifically, the wearing belts 130a and 130b are pulled out from both sides in an upper portion of the back surface plate 120 and reach the attaching/detaching buckle 132 from user's both shoulders, and the wearing belts 130c and 130d are pulled out of both sides in a lower portion of the back surface plate 120, and reach the attaching/detaching buckle 132 from user's both sides.

Furthermore, as illustrated in FIG. 3, the wearing belts 130a, 130b, 130c, 130d, 133a, and 133b are provided with the tactile stimulation units 131a to 131f (second tactile stimulation unit), respectively. Each tactile stimulation unit 131 is provided so as to touch a roughly appropriate position of the body of the user when the user pulls out the wearing belt from the winding unit and fix the same with the buckle on the front of the body. Specifically, when the user wears the wearing belt according to this embodiment, the attaching/detaching buckles 132 and 134 are located at the center of the front of the body of the user regardless of a body type of the user, and since the tactile stimulation units 131 are arranged within a predetermined distance from the attaching/detaching buckles 132 and 134, each tactile stimulation unit 131 touches a roughly appropriate position of the body (at appropriate distance from the chest center and the like of the body). For example, the tactile stimulation units 131a and 131b may be appropriately applied to both the shoulders, the tactile stimulation units 131c and 131d may be appropriate applied to ribs, and the tactile stimulation units 131e and 131f may be appropriately applied to both sides of the abdomen (under flanks). Note that each wearing belt is extendable/contractable by the winding unit.

Figure 5:
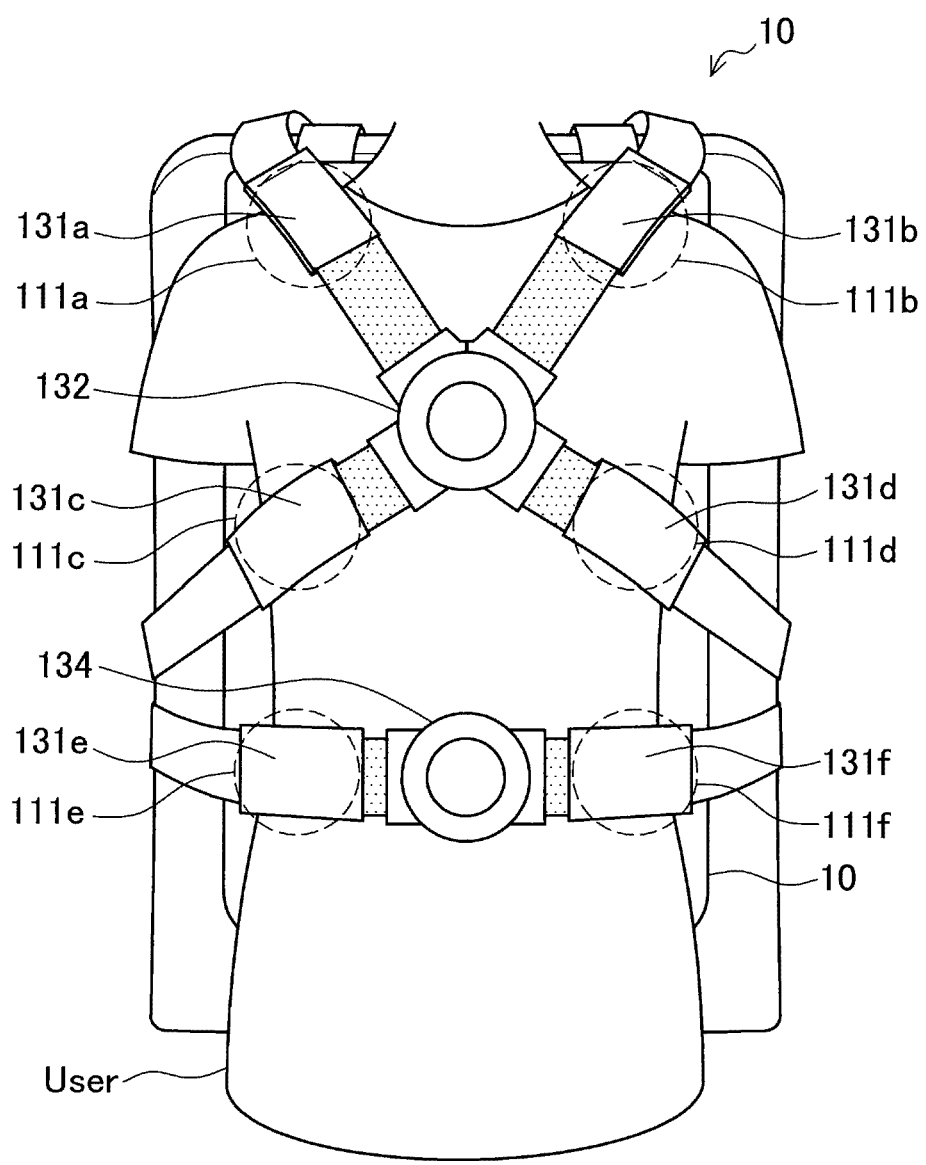
FIG. 5 is a view for explaining arrangement of tactile stimulation units when the tactile presentation device according to this embodiment is worn.

Subsequently, a more ideal arrangement relationship between the second tactile stimulation unit provided on the wearing belt and the first tactile stimulation unit provided on the back surface pad 110 is described with reference to FIG. 5. FIG. 5 is a view for explaining arrangement of the tactile stimulation units, when the tactile presentation device according to this embodiment is worn.

In an example illustrated in FIG. 5, as an example, by wearing the wearing belt, the tactile stimulation units 131a and 131b, the tactile stimulation units 131c and 131d, and the tactile stimulation units 131e and 131f are appropriately applied to both the shoulders, the ribs, and both the sides of the abdomen (under the flanks), respectively. Here, the tactile stimulation units 111a to 111f provided on the back surface pad 110 located on the back of the user are arranged in pairs with the tactile stimulation units 131a to 131f, respectively, (in positions facing each other across the body of the user). That is, the tactile stimulation units 111a and 111b, the tactile stimulation units 111c and 111d, and the tactile stimulation units 111e and 111f are located behind both the shoulders, the back port of the ribs, and the back portion of the abdomen, respectively, so as to make pairs with the tactile stimulation units 131a do 131f, respectively, across the body (the numbers of the tactile stimulation units 111 and the tactile stimulation units 131 are the same). Therefore, for example, by outputting the tactile stimuli from the tactile stimulation unit 131a and the tactile stimulation unit 111a, it becomes possible to allow to perceive the tactile effect in the body of the user interposed between the tactile stimulation units 131a and 111a, and that penetrating through the body of the user substantially horizontally.

Note that arrangement of the tactile presentation device according to this embodiment in which all the tactile stimulation units make pairs on the front and back as illustrated in FIG. 5, for example, is more preferable; however, the present disclosure is not limited thereto, and arrangement in which at least some of the tactile stimulation units make pairs on the front and back is also available. Furthermore, the arrangement of the first and second tactile stimulation units may be slightly displaced on the front and back.

Furthermore, in this embodiment, it becomes possible to apply the tactile stimulation units 131a to 131f to the body in roughly appropriate positions by wearing the wearing belt; however, moreover, it is also possible to finely adjust the positions of the tactile stimulation units 131a to 131f manually. For example, the positions of the tactile stimulation units 131a to 131f may be displaced within a range between the tactile stimulation units 131a to 131f and the attaching/detaching buckles 132 and 134 (hatched portions in FIG. 5). Note that when an adjustment range is large, the tactile stimulation unit 131 might be significantly displaced from the appropriate distance assumed from the center of the body (position of the attaching/detaching buckle), so that the adjustment range may be appropriately designed within a range that is not too wide.

Figure 6:
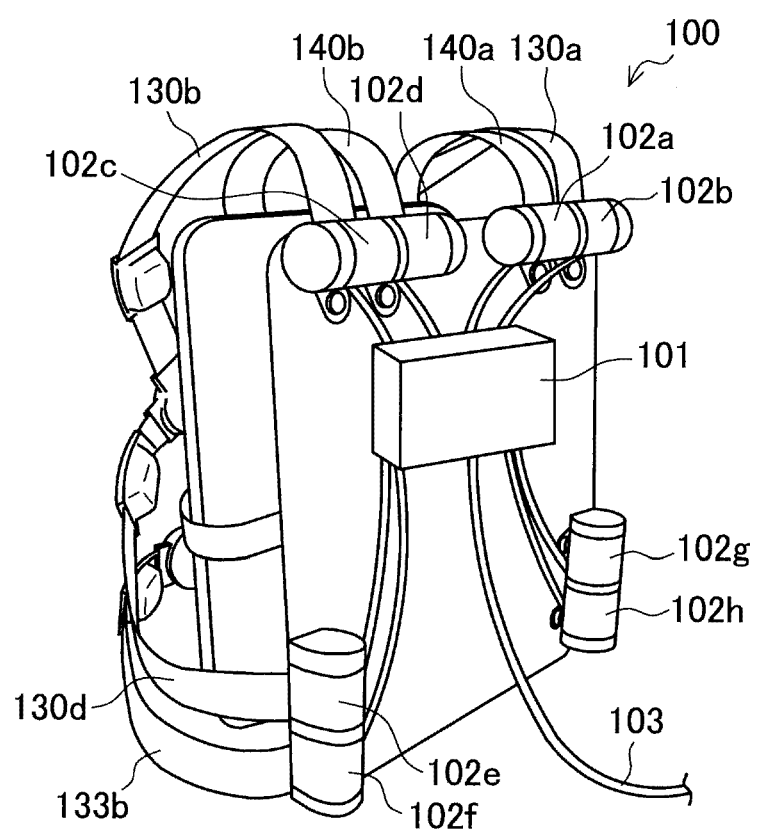
FIG. 6 is a view illustrating an internal structure of a back surface plate of the tactile presentation device according to this embodiment.

FIG. 6 is a view illustrating an internal structure of the back surface plate 120. As illustrated in FIG. 6, the back surface plate 120 stores winding units 102a to 102g of the respective belts and a control device 101.

The control device 101 includes the control unit 100 and the communication unit 160 illustrated in FIG. 2. Furthermore, the control device 101 is provided with a power cable 103. Furthermore, the connection to the reproduction control device 20 may be wired or wireless, and this may be connected to the reproduction control device 20 by wire using, for example, the power cable 103.

Furthermore, the control device 101 may also serve as a vibration signal control amplifier that amplifies the control signal (vibration pattern) received from the reproduction control device 20 as necessary, and transmits the same to each tactile stimulation unit through a flat cable and the like woven into a belt, for example.

(Automatic Adjustment of Back Surface Pad 110)

Subsequently, automatic adjustment of the back surface pad 110 according to this embodiment is described with reference to FIG. 7.

Figure 7:
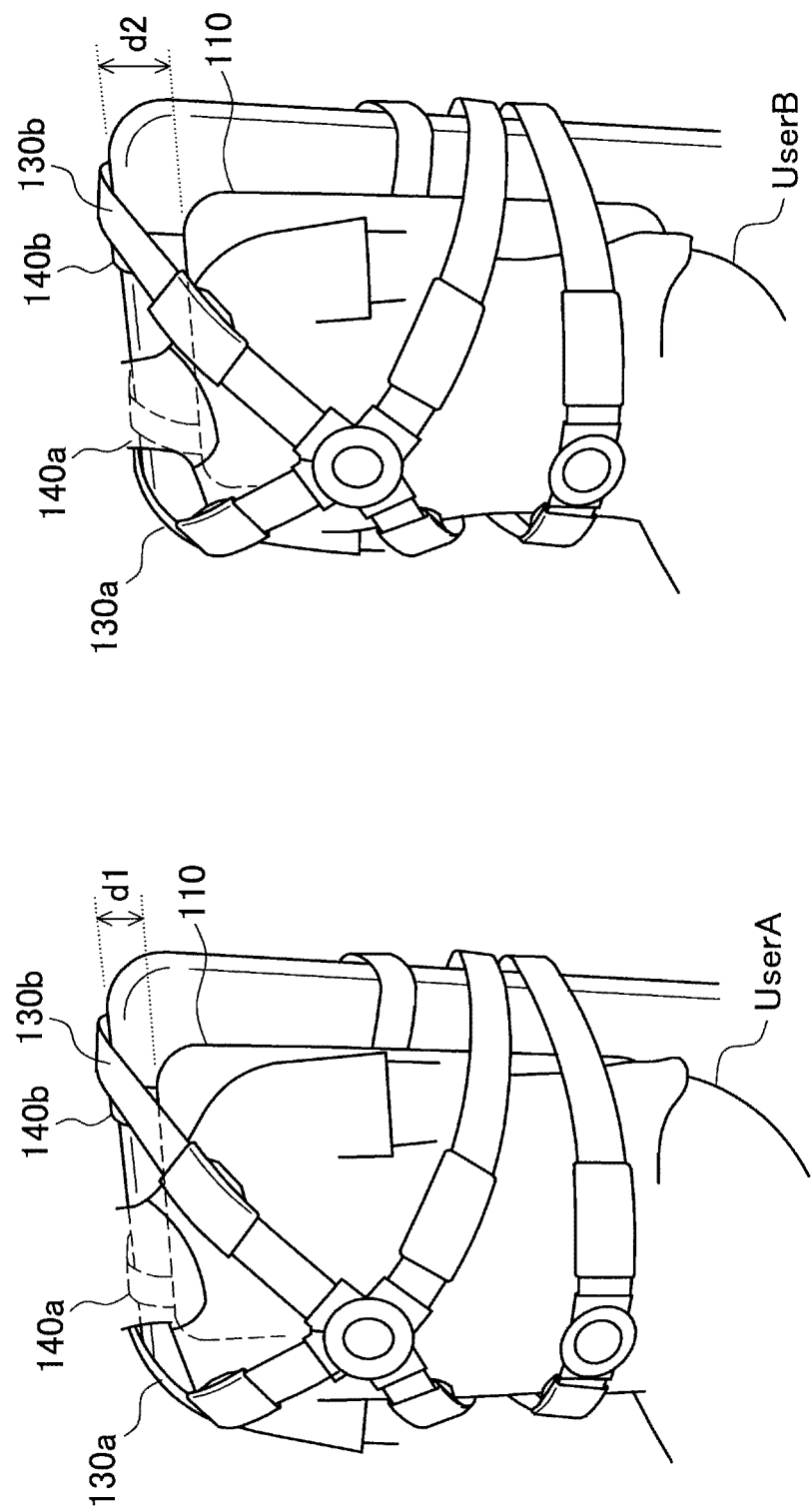
FIG. 7 is a view for explaining automatic adjustment of a back surface pad of the tactile presentation device according to this embodiment.

FIG. 7 is a view for explaining the automatic adjustment of the back surface pad 110 of the tactile presentation device according to this embodiment. In this embodiment, by automatically raising and lowering the back surface pad 110 in accordance with extension/contraction of the wearing belts 130a and 130b, the back surface pad 110 may be automatically arranged in an appropriate position regardless of the body type of the user. Therefore, no matter what type the body type of the user who wears, a positional relationship between the tactile stimulation unit 131 provided on the wearing belt and the tactile stimulation unit 111 provided on the back surface pad 110 becomes preferable arrangement (paired arrangement).

The height of the back surface pad 110 is adjusted by adjusting belts 140a and 140b; the winding units 102b and 102c of the wearing belts 130a and 130b, the winding units 102a and 102d of the adjusting belts 140a and 140b (refer to FIG. 6) link with one another according to extension/contraction of the wearing belts 130a and 130b. More specifically, a link operation such that the adjusting belts 140a and 140b are wound as the wearing belts 130a and 130b are pulled out, whereas the adjusting belts 140a and 140b are extended as the wearing belts 130a and 130b are wound is automatically performed. Although a structural mechanism of the link operation is not especially limited, for example, it may be adjusted by a predetermined ratio such that when the wearing belts 130a and 130b extend by 3 cm, the adjusting belts 140a and 140b are contracted by 1 cm and the like.

Therefore, for example, as illustrated in FIG. 7, it is possible to appropriately respond to a difference in body type due to gender and a difference in body shape. For example, in a case of a user A having a large body type as illustrated in a left side of FIG. 7, the adjusting belts 140a and 140b contract (length according to pullout of the wearing belts 130a and 130b and the back surface pad 110 is raised, so that an upper end of the back surface pad 110 is on the same level as the user A's shoulder. In contrast, in a case of a user B having a small body type as illustrated in a right side of FIG. 7, since the wearing belts 130a and 130b are not pulled out much, the adjusting belts 140a and 140b extend (length d2>d1) and the back surface pad 110 is lowered, so that the upper end of the back surface pad 110 is on the same level as the user B's shoulder.

«3. Operation Processing»

Figure 8:
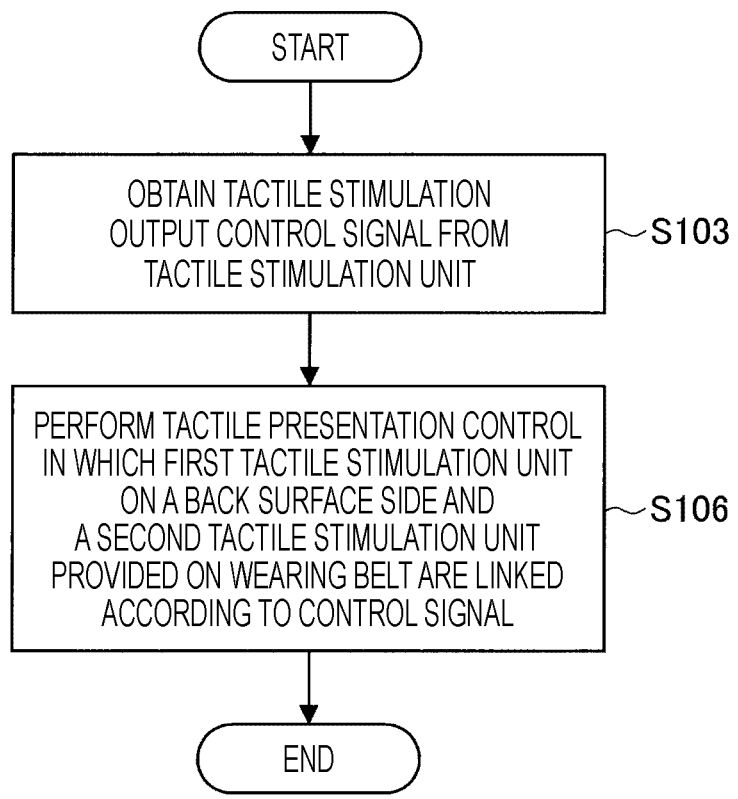
FIG. 8 is a flowchart illustrating an example of a flow of operation processing of a tactile presentation system according to this embodiment.

Subsequently, operation processing of the tactile presentation system according to this embodiment is described with reference to FIG. 8. FIG. 8 is a flowchart illustrating an example of a flow of the operation processing of the tactile presentation system according to this embodiment.

As illustrated in FIG. 8, the tactile presentation device 10 first obtains a tactile stimulus output control signal from the tactile stimulation unit (step S103). For example, the tactile presentation device 10 receives such control signal from the reproduction control device 20.

Next, the tactile presentation device 10 performs, in response to the control signal, tactile presentation control in which the first tactile stimulation unit (tactile stimulation unit 111) on the back surface side and the second tactile stimulation unit (tactile stimulation unit 131) provided on the wearing belt are linked (step S106). This allows the user to perceive the tactile effect in the body of the user.

Note that the presentation of the tactile effect is not limited to the inside of the body, and for example, by controlling one or more tactile stimulation units on the back surface side or the wearing belt side, it is possible to realize presentation of the tactile stimulus on the body surface, and movement of the perceptual position of the tactile on the body surface by link of the plurality of tactile stimulation units. Furthermore, by link of the tactile stimulation units on the back surface side and the wearing belt side, it is possible to realize the movement of the perceptual position of the tactile stimulus that moves diagonally inside the body (for example, from the upper portion of the body front to the lower portion of the body back). Since each tactile stimulation unit is brought into contact with an appropriate position of the body by easier wearing/removal, becomes possible to more reliably and effectively provide the user with the tactile effect assumed by a provider.

«4. Six-Sided Views of Tactile Presentation Device 10»

Figure 9:
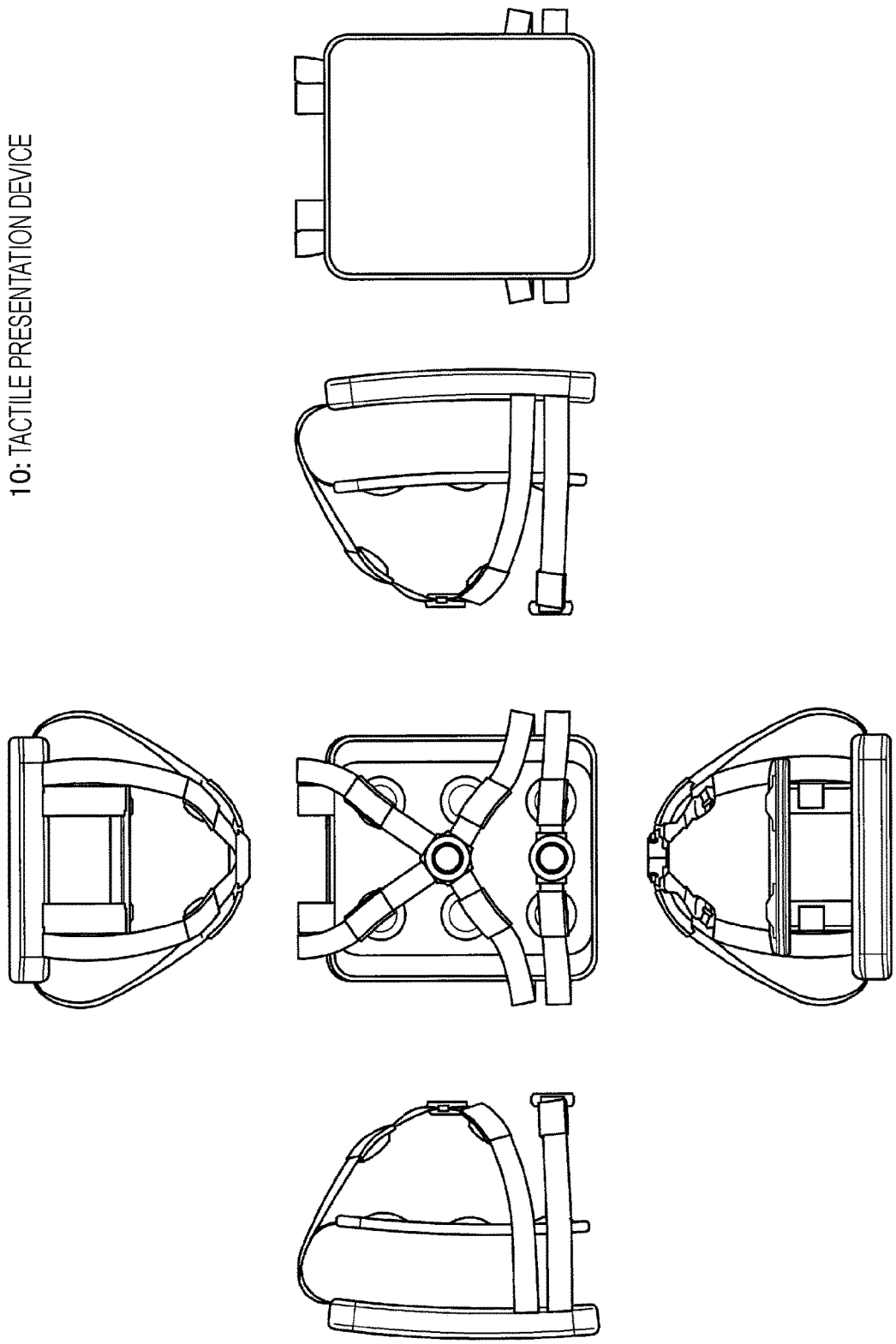
FIG. 9 is six-sided views of an example of the tactile presentation device according to this embodiment.

FIG. 9 is six-sided views (front view, plan view, right side view, left side view, bottom view, and rear view) illustrating an example of the tactile presentation device 10 according to this embodiment described above. Furthermore, FIG. 10 is six-sided views illustrating an example of a state in which the attaching/detaching buckles 132 and 134 of the tactile presentation device 10 according to this embodiment are detached.

Figure 10:
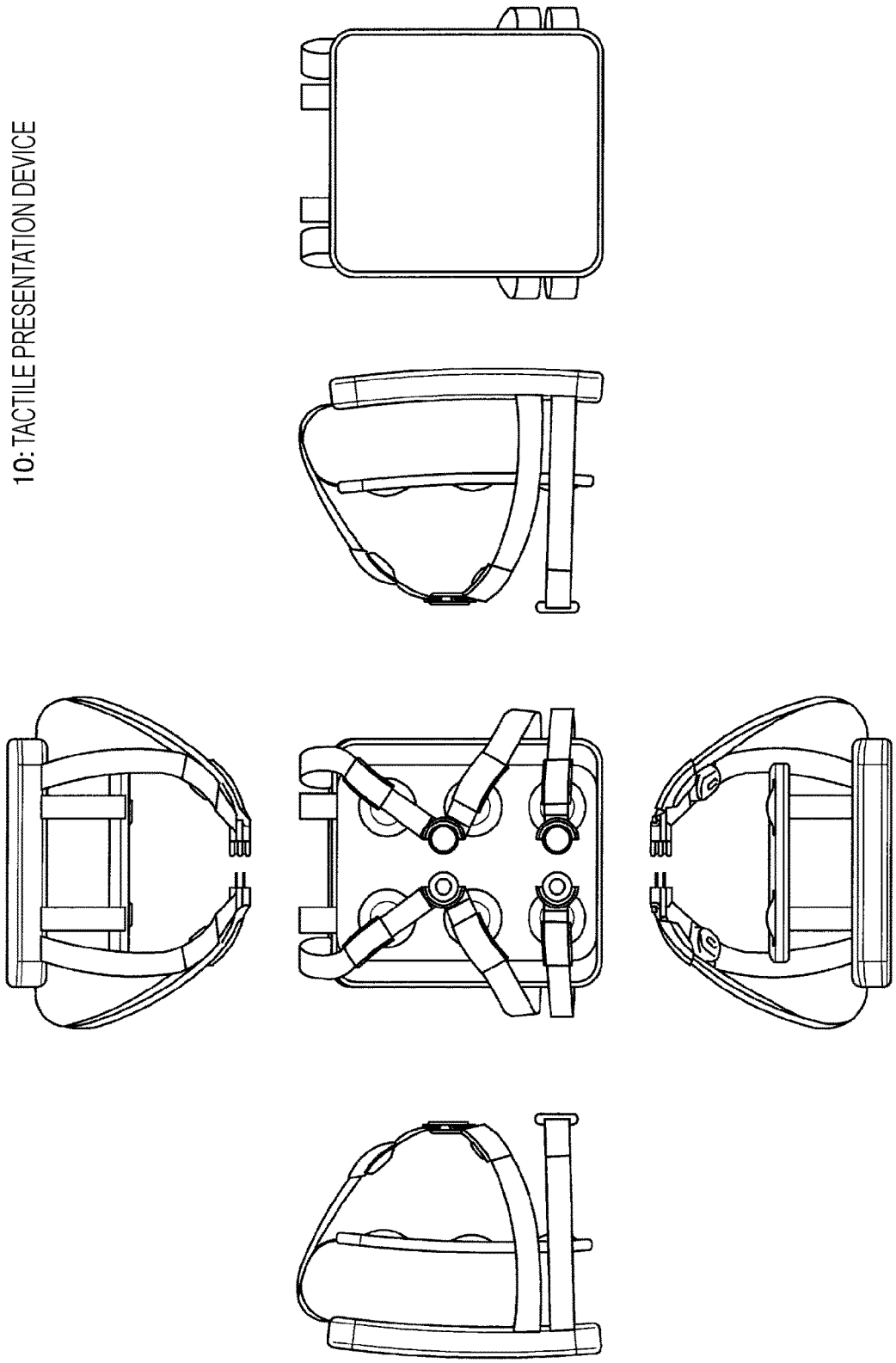
FIG. 10 is six-sided views of an example of the tactile presentation device according to this embodiment in a state in which an attaching/detaching buckle is detached.

As illustrated in FIGS. 9 and 10, the tactile presentation device 10 according to this embodiment may be easily worn by the user himself/herself by attaching/detaching the attaching/detaching buckles 132 and 134.

Note that although the fixing belt 150 that connects the back surface plate 120 and the back surface pad 110 described with reference to FIG. 3 is not illustrated in FIGS. 9 and 10, the fixing belt 150 may be further included in the configuration illustrated in FIGS. 9 and 10.

«5. Variation»

Subsequently, a variation of the tactile presentation device 10 according to this embodiment is described.

<5-1. Device of Adhesion of Tactile Stimulation Unit to Body>

By making the tactile stimulation units 131 provided on the extendable/contractable wearing belts 10 and 133 of the tactile presentation device 10 according to this embodiment have a structure adhering more closely to the body, an advantageous effect of improving a feeling of vibration (and improving vibration efficiency) may be obtained. Specifically, there are following variations.

(5-1-1. Usage of Elastically Deformable Member)

Figure 11:
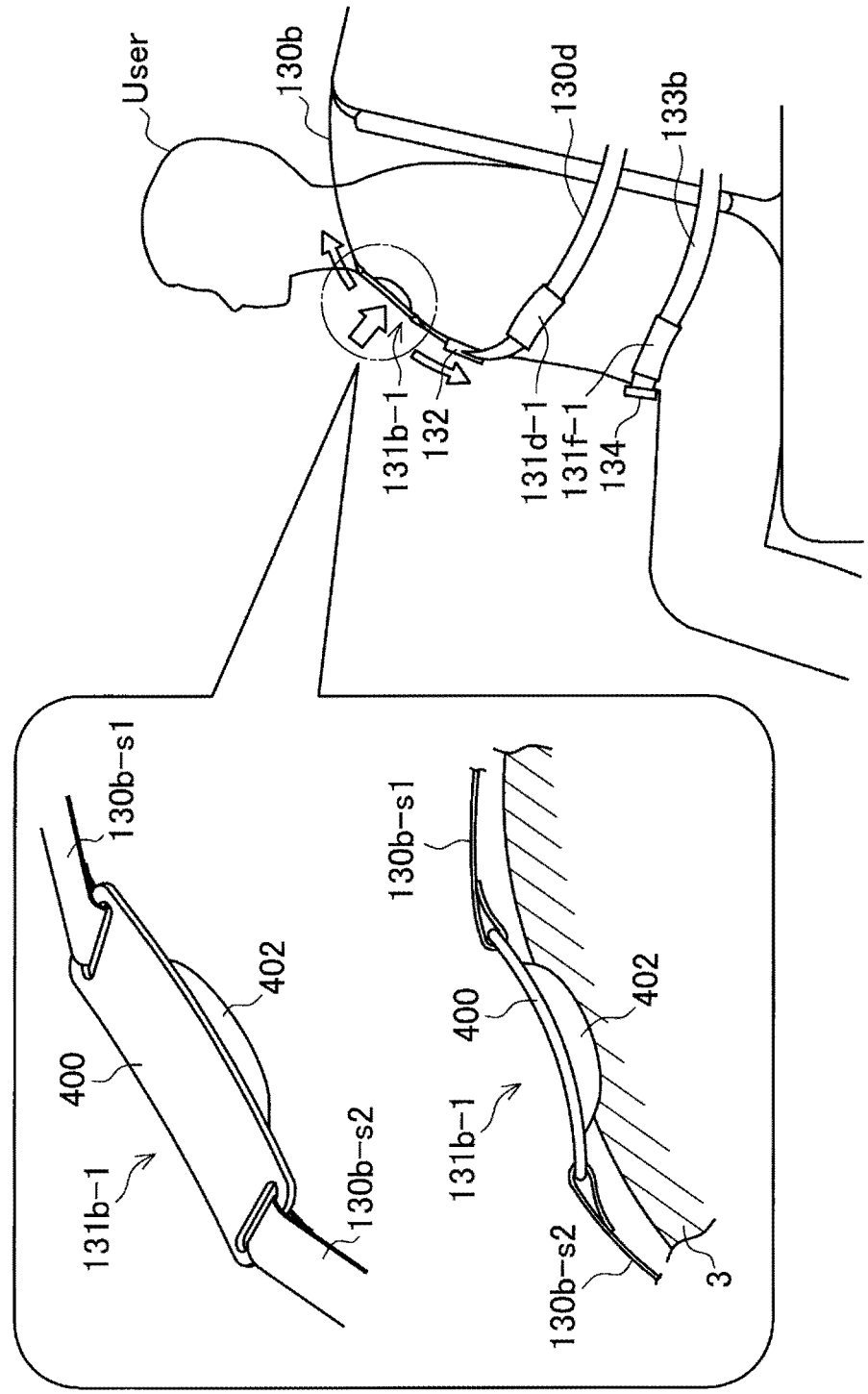
FIG. 11 is a view for explaining a tactile stimulation unit according to a first variation of this embodiment.

FIG. 11 is a view for explaining a tactile stimulation unit 131 according to a first variation of this embodiment. As illustrated in FIG. 11, each of tactile stimulation units 131-1 (131b-1 and 131d-1) according to the first variation includes a leaf spring 400 that is an example of an elastically deformable member and a vibration device 402 (actuator that generates vibration) provided on a curved convex side of the leaf spring 400, the side brought into contact with a body 3.

The leaf spring 400 is provided in the middle of a wearing belt 130b; for example, as illustrated in FIG. 11, the leaf spring 400 may be provided such that both ends thereof are connected to the wearing belt 130b (130b-s1 and 130b-s2). The wearing belt 130b-s1 is pulled by a winding unit 102 (refer to FIG. 6, not illustrated in FIG. 11) located on the back of a user, and the wearing belt 130b-s2 is mounted on an attaching/detaching buckle 132.

The both ends of the leaf spring 400 are pulled by the wearing belts 130b-s1 and 130b-s2, respectively, so that a force that presses the vibration device 402 provided on the convex side of the curved surface of the leaf spring 400 substantially perpendicularly to the body 3 is generated, and it becomes possible to allow the vibration device 402 to adhere more closely to the body 3.

The structure of such tactile stimulation unit 131b-1 is also applicable to other tactile stimulation units 131 provided on the wearing belts 130 and 133, and an effect of allowing the vibration device to adhere more closely to the body 3 may be similarly obtained.

Furthermore, the structure of such tactile stimulation unit 131b-1 is not limited to a safety belt type, and may also be applicable to the tactile stimulation unit provided on a belt portion capable of tightening provided on a jacket and the like worn by the user. By tightening the belt portion, a force that presses the vibration device provided on the convex side of the curved surface substantially perpendicularly to the body 3 is generated, and the vibration device is allowed to adhere more closely to the body 3.

Furthermore, although the leaf spring is used an example of the elastically deformable member, this variation is not limited to this, and it is sufficient that tension of the belt may generate a pressing force to the body 3 of the vibration device provided on the belt, for example.

(5-1-2. Usage of Materials with Different Elasticity)

Figure 12:
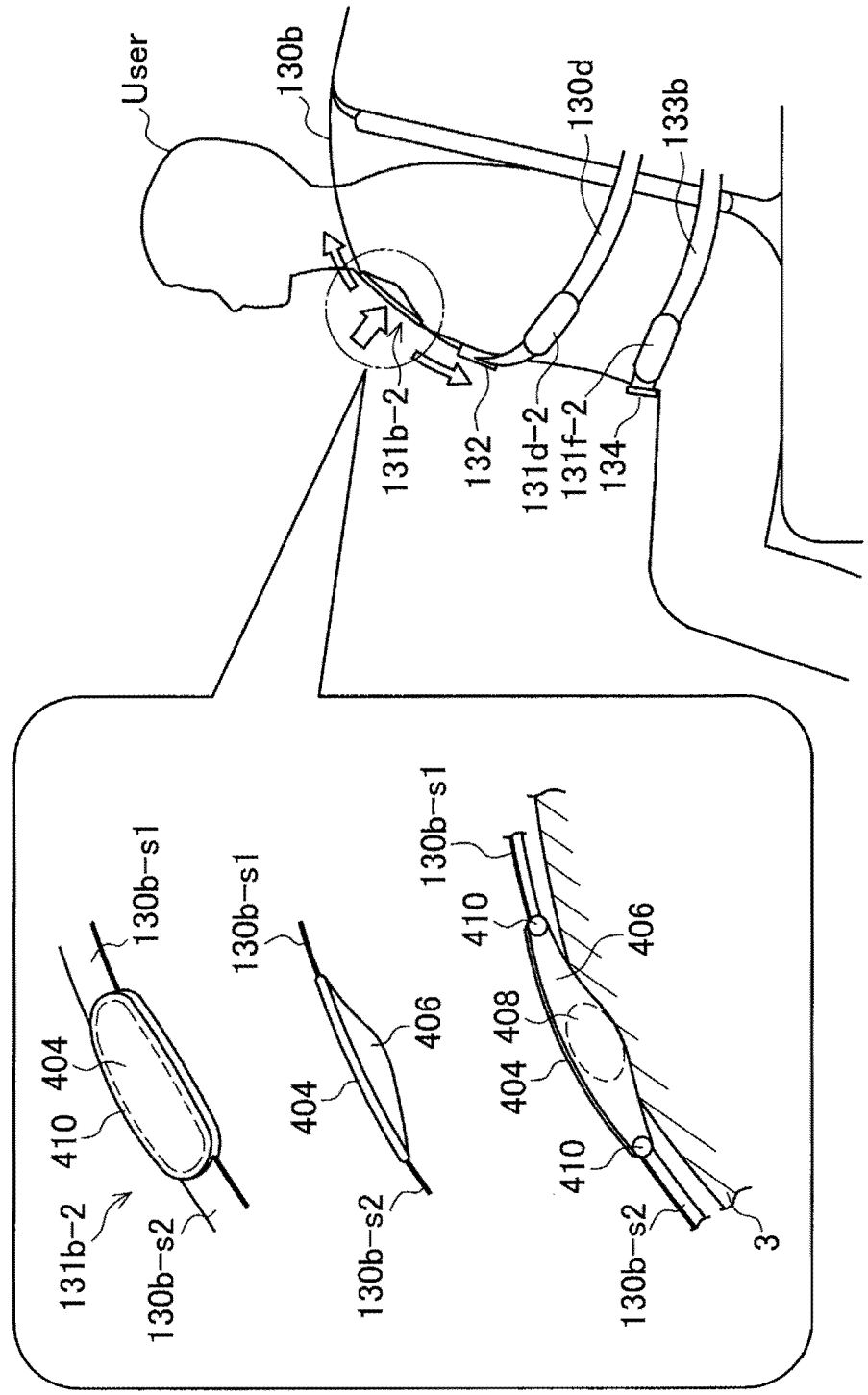
FIG. 12 is a view for explaining a tactile stimulation unit according to a second variation of this embodiment.

FIG. 12 is a view for explaining a tactile stimulation unit 131 according to a second variation of this embodiment. As illustrated in FIG. 12, each of tactile stimulation units 131-2 (131b-2 and 131d-2) according to the second variation has a structure in which a vibration device 408 (actuator that generates vibration) is provided in a space between a first material 404 and a second material 406 having different elastic A control signal for controlling vibration of the vibration device 408 is input by wire or wirelessly.

As illustrated in FIG. 12, the second material 406 is provided on a body 3 side, and vibration of the internal tactile stimulation unit 131-2 is transmitted to the body 3 of a user through the second material 406. Elasticity of the second material 406 is higher than that of the first material 404, and the second material 406 relatively expand more than the first material 404, so that the vibration device 408 interposed between the first material 404 and the second material 406 to be fixed is relatively pushed toward the body 3 side.

Moreover, the vibration of the tactile stimulation unit 131-2 may be transmitted to the second material 406, which has relatively higher elasticity than the first material 404, more efficiently, that is, with small energy loss of vibration, so that a degree of adhesion of the vibration device 408 to the body 3 is improved.

Furthermore, by making a hollow frame structure in which the vibration device 408 is not brought into contact with a frame 410 and is fixed by being interposed between the first material 404 and the second material 406, is possible to prevent generation of an unnecessary collision sound by contact between the vibration device 408 and the frame 410.

Some specific examples of the first material 404 and the second material 406 are illustrated. For example, a non-stretching material may be used as the first material 404 and a stretching material may be used as the second material 406. Specifically, for example, leather may be used as the first material 404 and spandex may be used as the second material 406. Furthermore, rubber silicon may be used as the first material 404 and chloroprene rubber may be used as the second material 406. Furthermore, a gut (used for a tennis racket, a string or a musical instrument and the like) (in a state of being assembled in a mesh shape) may be used as the first material 404, and a braid may be used as the second material 406.

They are examples, and materials and combinations thereof are not limited thereto. Furthermore, the same material may be used as long as the elasticity is different depending on a knitting method and thickness.

The structure of such tactile stimulation unit 131b-2 is also applicable to other tactile stimulation units 131 provided on the wearing belts 130 and 133, and an effect of allowing the vibration device to adhere more closely to the body 3 may be similarly obtained.

Furthermore, the structure of such tactile stimulation unit 131b-2 is not limited to a safety belt type, and may also be applicable to the tactile stimulation unit provided on a belt portion capable of tightening provided on a jacket and the like worn by the user.

(Usage of Hold Ring)

Figure 13:
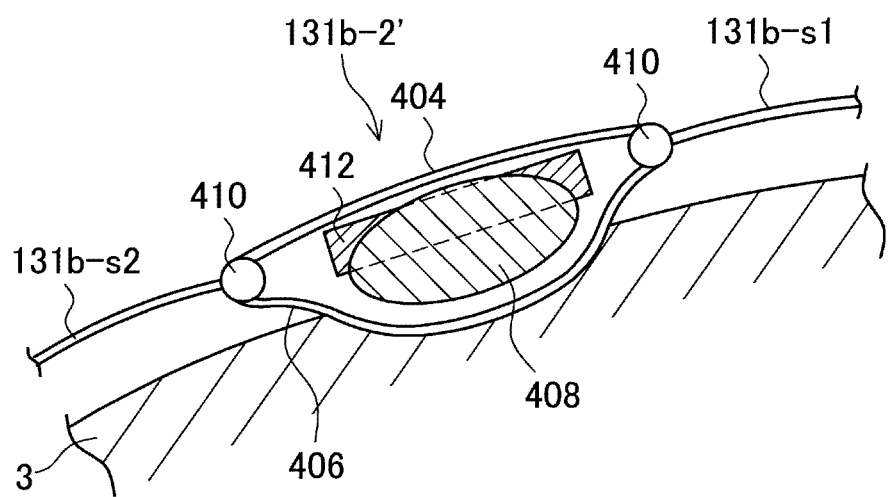
FIG. 13 is a view for explaining a tactile stimulation unit according to an applied example of the second variation of this embodiment.

FIG. 13 is a view for explaining a tactile stimulation unit 131-2' according to an applied example of the second variation of this embodiment. Since a first material 404, a second material 406, a vibration device 408, and a frame 410 illustrated in FIG. 13 have configurations similar to those with the same reference signs in FIG. 12, detailed description thereof is herein omitted.

The tactile stimulation unit 131-2' according to this applied example includes a hold ring 412 that supports the vibration de ice 408 between the first material 404 and the second material 406. The hold ring 412 is a ring having different diameters and widths at the top and bottom just as a squid ring. Therefore, at the time without vibration, the vibration device 408 is in a state of fitting tightly into the hold ring 412 due to a restraining force of the second material 406 (stretching material), but at the time of vibration, the vibration device 408 moves in a direction toward the second material 406 having higher elasticity than the first material 404, and is put into a state in which this may freely move at a short distance away from the hold ring 412. Therefore, the vibration of the vibration device 408 may be transmitted to a body 3 more efficiently (without energy loss).

Furthermore, the hold ring 412 may be the ring that absorbs the vibration such as rubber or silicon, for example. Therefore, it possible to prevent generation of an unnecessary collision sound due to contact between the vibration device 408 and the hold ring 412.

(5-1-3. Usage of Fixture)

Figure 14:
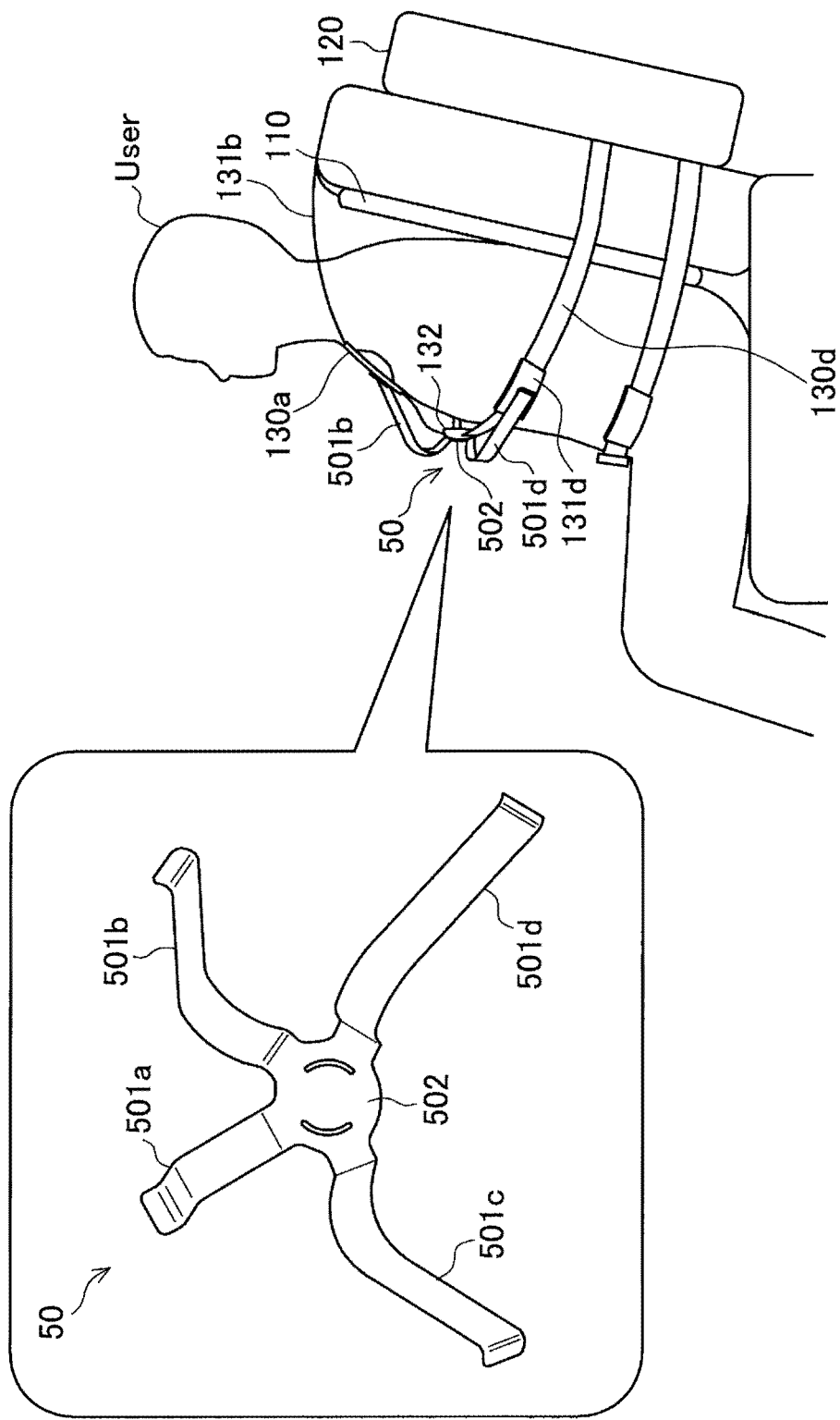
FIG. 14 is a view for explaining usage of a fixture according to a third variation of this embodiment.

FIG. 14 is a view for explaining usage of a fixture 50 according to a third variation of this embodiment. As illustrated in FIG. 14, the fixture 50 according to the third variation includes a plurality of elastic body arms 501 and a mounting unit 502. The plurality of elastic body arms 501 is extended centering on the mounting unit 502.

After wearing a belt, a user mounts the mounting unit 502 of the fixture 50 on an attaching/detaching buckle 132, and allows distal ends of the plurality of elastic body arms 501 of the fixture 50 to be located on tactile stimulation units 131 provided on a wearing belt 130, respectively, as illustrated in FIG. 14. Although a mounting method of the mounting unit 502 on the attaching/detaching buckle 132 is not especially limited, for example, is possible to hook the mounting unit 502 on a structure provided on the attaching/detaching buckle 132 side, and rotates the mounting unit 502 to be fastened to the attaching/detaching buckle 132. Furthermore, although a joining method of the distal end of the elastic body arm 501 to the tactile stimulation unit 131 is not especially limited, for example, it is possible to prevent the distal end of the elastic body arm 501 from displacing from the tactile stimulation unit 131 receiving (the distal end of the elastic body arm 501) by a material having a sufficient frictional effect on the tactile stimulation unit 131 side or by an uneven structure. In this manner, when the attaching/detaching buckle 132 is mounted on the mounting unit 502 of the fixture 50, the attaching/detaching buckle 132 floats from the body to be pulled toward the mounting unit 502, so that a pressing force (pressure) starting from the attaching/detaching buckle 132 to the tactile stimulation unit 131 by the elastic body arm 501 is generated.

In this manner, in this variation, by attaching the fixture 50 after the belt is worn, it becomes possible to allow the tactile stimulation unit 131 to adhere more closely to the body, and transmit the vibration efficiently (without energy loss) to the body.

Note that the structure of the tactile stimulation unit 131 used in this variation may be that by each variation described above.

(5-1-4. Contact Area of Vibration Device With Body)

A contact surface with the body of the tactile stimulation unit 131 according to this embodiment may be a curved surface. That is, the tactile stimulation unit 131 may have a structure with an elliptical curved surface with respect to the body, for example.

Furthermore, a contact area of the tactile stimulation unit 131 with the body is desirably, for example, 25 mm to 50 mm in diameter. Such a numerical value is an example, and this embodiment is not limited to this.

In a case where the contact area of the tactile stimulation unit 131 with the body is too narrow, this has a shape like a protrusion (dot shape and the like), and pain occurs by vibration or pressing, whereas in a case where the contact area is too large, this is not desirable in terms of vibration efficiency (that is, vibration intensity needs to be made higher in order to give desired perception, result ng in high power consumption). Therefore, the contact area of the tactile stimulation unit 131 with the body is desirably designed in advance with an appropriate size according to vibration intensity setting, a body site of contact (tactile level of the body site), desired perception and the like.

<5-2. Vibration Control According to Attaching/Detaching State of Buckle>

The tactile presentation device 10 or the reproduction control device 20 according to this embodiment may determine whether or not vibration control of the tactile presentation device 10 (specifically, the tactile stimulation units 131 and 111) may be performed according to an attaching/detaching state of the buckle. Specifically, the tactile presentation device 10 or the reproduction control device 20 determines whether or not the vibration control may be performed on the basis of a detection result of the attaching/detaching states of the attaching/detaching buckles 132 and 134.

That is, the tactile presentation device 10 or the reproduction control device 20 turns on the vibration control in a case where the attaching/detaching buckles 132 and 134 are attached, and turns off the vibration control when they are detached. Therefore, it becomes possible to prevent unnatural vibration of the tactile presentation device 10 in an empty seat and unnecessary vibration in a case where this is temporarily detached due to deterioration in physical condition.

The attaching/detaching state of the attaching/detaching buckles 132 and 134 may also be detected, for example, on the basis of whether or not metal parts of the attaching/detaching buckles 132 and 134 are energized (by a structure being energized when being attached, attachment/detachment may be detected). Alternatively, each of the attaching/detaching buckles 132 and 134 may be provided with a mechanical switch and the like so that attachment/detachment may be detected.

<5-3. Adhesion of Belt on Shoulder>

Subsequently, it is described how to prevent the wearing belts 130a and 130b on both the shoulders from floating in a safety belt type tactile presentation device 10.

As illustrated in FIGS. 3 to 5 referred to above, the wearing belts 130a and 130b provided with the tactile stimulation units 131a and 131b on both the shoulders when the tactile presentation device 10 is worn are pulled out from the back surface plate 120 located behind the back plate of the chair, and reaches from an upper portion behind user's both shoulders to a front side of user's both shoulders through an upper portion of the back plate. Therefore, depending on a size of the body of the user, a relationship between the height of the back plate and the height of the user's shoulder and the like, a case is assumed where the wearing belts 130a and 130b float from the shoulders and the vibration of the tactile stimulation unit 131 is not efficiently transmitted to the body.

In the above-described "5-1. Device of adhesion of tactile stimulation unit to body", the variation in which the tactile stimulation unit 131 is allowed to adhere more closely to the body is described, but in this variation, a device of making the wearing belt 130 provided with the tactile stimulation unit 131 itself adhere more closely to the body is described. Note that in a tactile presentation device 10-4a according to a fourth variation herein described also, the control signal for controlling the vibration may be input by wire or wirelessly.

(5-3-1. Example of Allowing Wearing Belt to Penetrate Through Chair)

Figure 15:
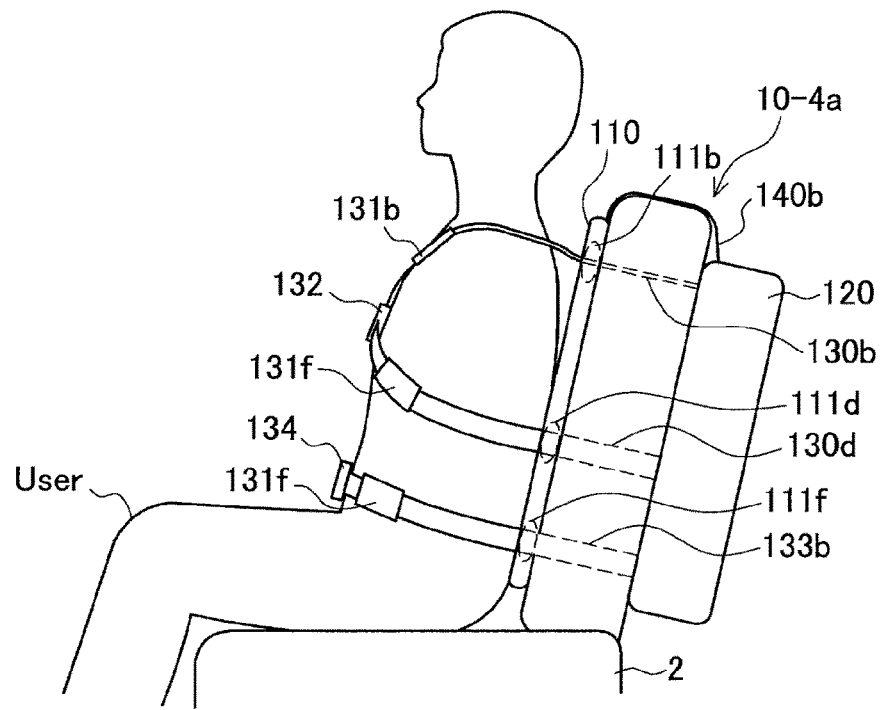
FIG. 15 is a schematic side view for explaining a tactile presentation device according to a fourth variation of this embodiment.

FIG. 15 is a schematic side view for explaining a tactile presentation device 10-4a according to the fourth variation of this embodiment. Since FIG. 15 is a right side view of the tactile presentation device 10-4a mounted on a chair 2, for example, a wear ng belt 130a pulled out from a back surface plate 120 overlaps with a wearing belt 130b and is not visible in the drawing.

In this variation, as illustrated in FIG. 15, the wearing belt 130b (and the wearing belt 130a) pulled out from the back surface plate 120 is allowed to penetrate through an upper portion of a back plate of the chair 2 and a back surface pad 110 located between the back of a user and the back plate of the chair 2, and an outlet of the belt is arranged in a position lower than a position of the user's shoulder, so that it becomes possible to firmly press the wearing belt 130b (and the wearing belt 130a) against the shoulder and chest, thereby improving transmission efficiency of vibration (that is, it is possible to feel the same vibration intensity to be more intense).

Furthermore, a wearing belt 130d (and a wearing belt 130c) worn in a horizontal direction on user's ribs and a wearing belt 133b (and a wearing belt 133a) worn in the horizontal direction on user's abdomen are similarly allowed to penetrate through the back plate or the chair 2 and the back surface pad 110, and outlets of the belts are arranged on an inner side of a width of the back of the user. Therefore, it is possible to firmly press the wearing belt 130b (and the wearing belt 130a) and the wearing belt 133b (and the wearing belt 133a) around waist such as the ribs and the abdomen, and it is possible to improve the transmission efficiency of vibration (that is, it is possible to feel the same vibration intensity more intense).

Note that it may also be configured such that the back surface plate 120 is provided in the back plate of the chair 2.

(5-3-2. Example of Allowing Wearing Belt to Penetrate Through Back Surface Pad)

Figure 16:
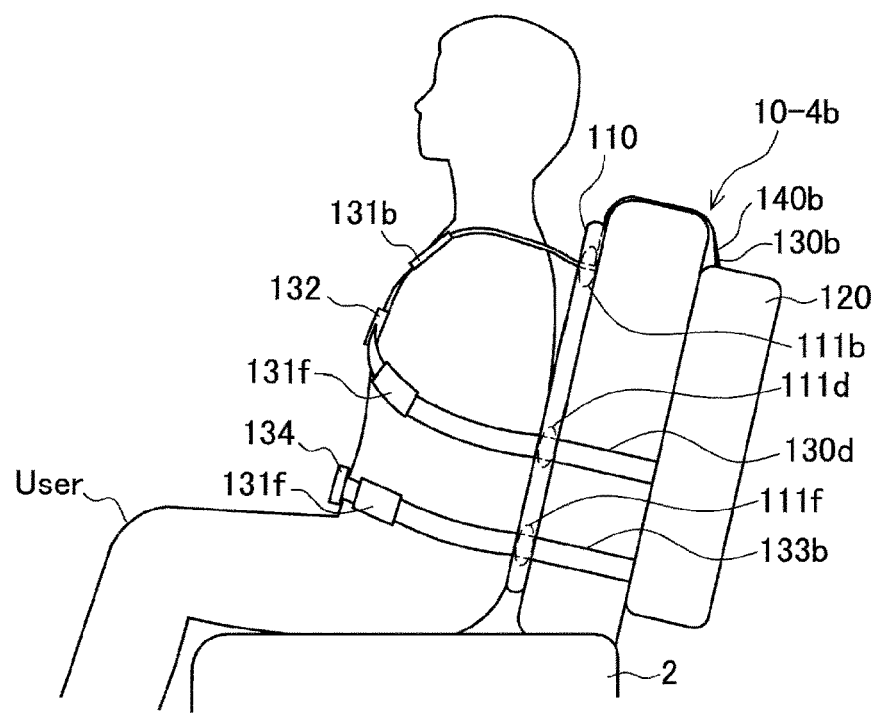
FIG. 16 is a schematic side view for explaining a tactile presentation device according to another example of the fourth variation of this embodiment.

FIG. 16 is a schematic side view for explaining a tactile presentation device 10-4b according to another example of the fourth variation of this embodiment. In the example with reference to FIG. 15 described above, the chair 2 needs to be modified, but in the example illustrated in FIG. 16 herein described, the chair 2 does not need to be modified, and the tactile presentation device 10-4b may be installed on an existing chair.

Specifically, as illustrated in FIG. 16, by configuring to allow a wearing belt 130b (and a wearing belt 130a) pulled out from a back surface plate 120 to pass through an upper portion of a back plate of the chair 2 to penetrate through a back surface pad 110, it becomes possible to arrange an outlet of the belt in a position lower than a height of the user's shoulder. Therefore, it becomes possible to firmly press the wearing belt 130b (and the wearing belt 130a) against the Shoulder and chest, and transmission efficiency or vibration may be improved.

Furthermore, as for a wearing belt 130d (and a wearing belt 130c) and a wearing belt 133b (and a wearing belt 133a) similarly, by configuring them to be pulled out from the back surface plate 120 to pass through a lateral side of the back plate of the chair 2 to penetrate the back surface pad 110, it becomes possible to arrange outlets of the belts on an inner side of a width of the back of the user. Therefore, it becomes possible to firmly press the wearing belt 130b (and the wearing belt 130a) and the wearing belt 133b (and the wearing belt 133a) around waist such as ribs and abdomen, thereby improving the transmission efficiency vibration.

Note that in order to avoid an effect of a pressure on the back plate by the back surface pad 110 with respect to the wearing belts 130 and 133 that pass through the back surface pad 110, for example, it is possible to form grooves of a belt width on the back of the back surface pad 110 as paths to through holes of the wearing belts 130 and 133, and allow the belts to pass therethrough. Alternatively, it is also possible to form L-shaped pipe-shaped through holes for allowing the belts to pass in the back surface pad 110 so as to allow the belts to pass therethrough.

Figure 17:
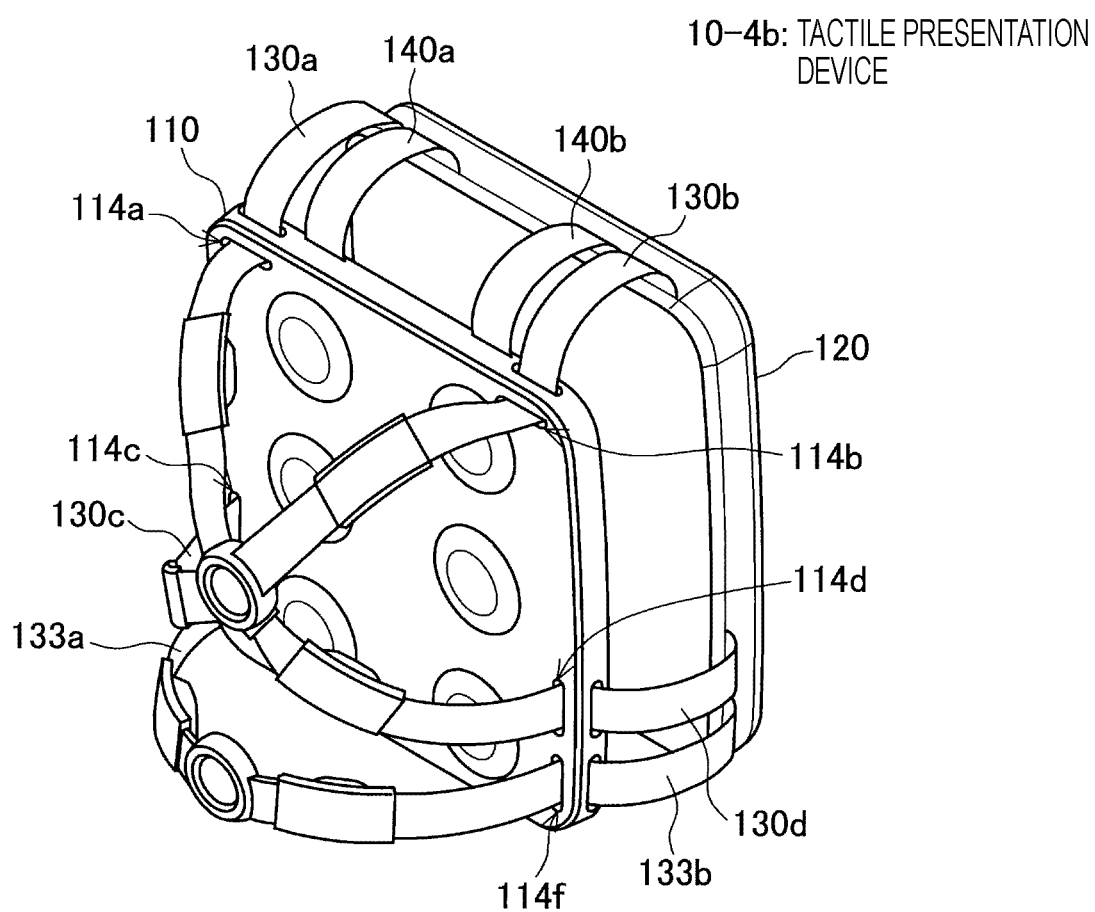
FIG. 17 is a perspective view of a tactile presentation device according to another example of the fourth variation of this embodiment.

Here, FIG. 17 illustrates a perspective view of the tactile presentation device 10-4b according to the other example of the fourth variation of this embodiment. Furthermore, FIG. 18 is six-sided views of the tactile presentation device 10-4b according to the other example of the fourth variation of this embodiment.

Figure 18:
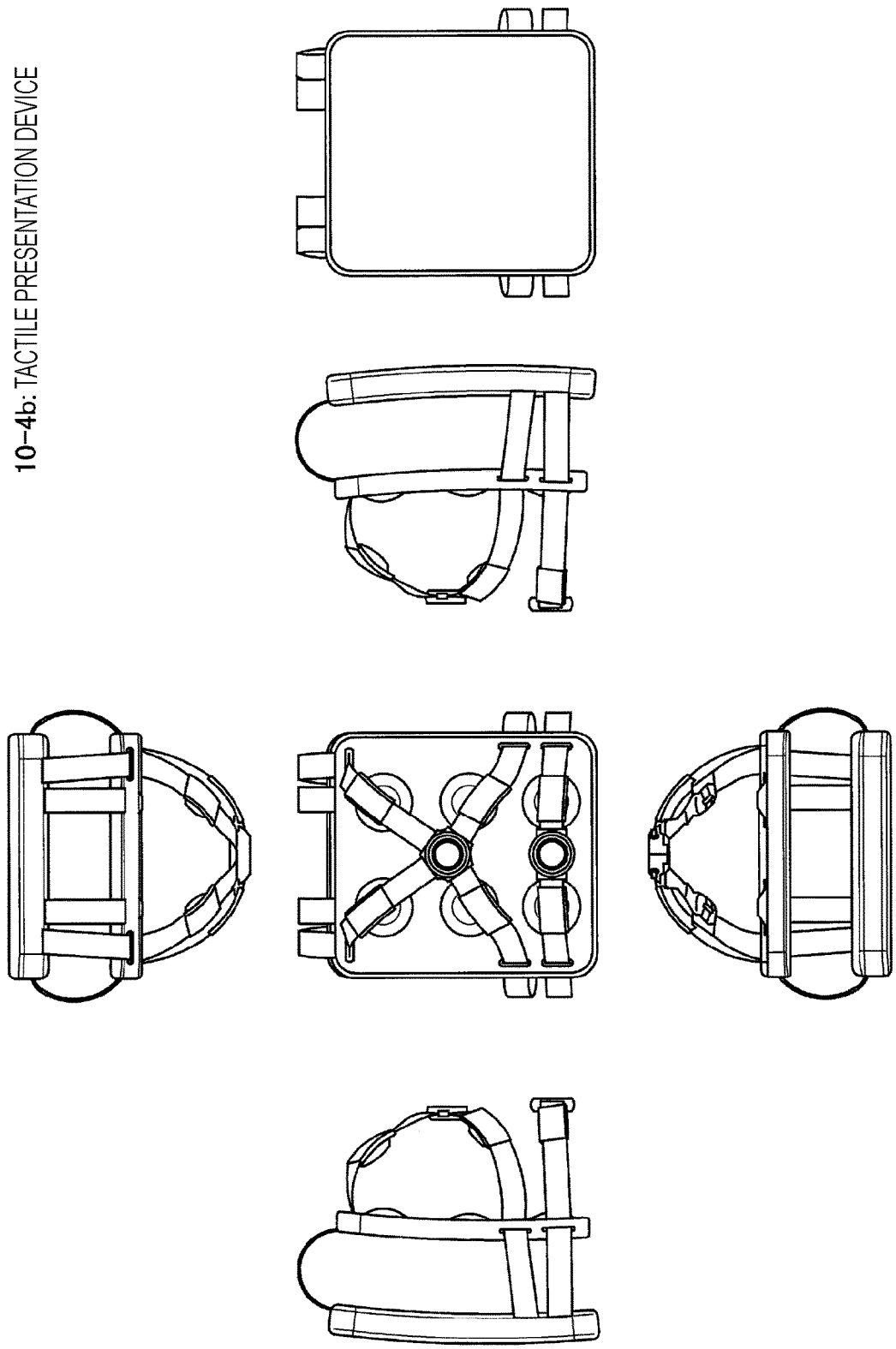
FIG. 18 is six-sided views of the tactile presentation device according to another example of the fourth variation of this embodiment.

As illustrated in FIGS. 17 and 18, by configuring such that the wearing belts 130a to 130d, 133a, and 133b pulled out from the back surface plate 120 penetrate through through holes 114a to 114f of the back surface pad 110, respectively, it is configured such that the wearing belts are pulled out from the outlets (openings of the through holes 114 on a front side of the back surface pad 110) of the wearing belts located on the inner side of the back of the user wearing the tactile presentation device 10-4b and it becomes possible to firmly press the wearing belts against the body.

<5-4. Combination of Three-Point Safety Belt>

Next, an example of a tactile presentation device in which a three-point safety belt is combined is described.

In the tactile presentation device 10 according to the above-described embodiment and variation, it is necessary to twist the body halfway in order to pass both arms through the wearing belt when wearing and removing. In contrast, with a tactile presentation device 10-5 in which the three-point safety belt is combined presented as a fifth variation, wearing belts are pulled out from both right and left sides to be worn, so that it becomes possible to wear the same without twisting the body. Furthermore, with the tactile presentation device 10-5 according to the fifth variation also, a tactile stimulation unit is pressed against the body by a pressure of the safety belt, and a pressing effect similar to that of the above-described embodiment may be obtained.

Hereinafter, it is specifically described with reference to FIGS. 19 to 22. Note that in the example of the tactile presentation device 10-5 in which the three-point safety belt is combined also, a control signal for controlling vibration may be input by wire or wirelessly.

(5-4-1. Example of Combining Two Three-Point Safety Belts)

Figure 19:
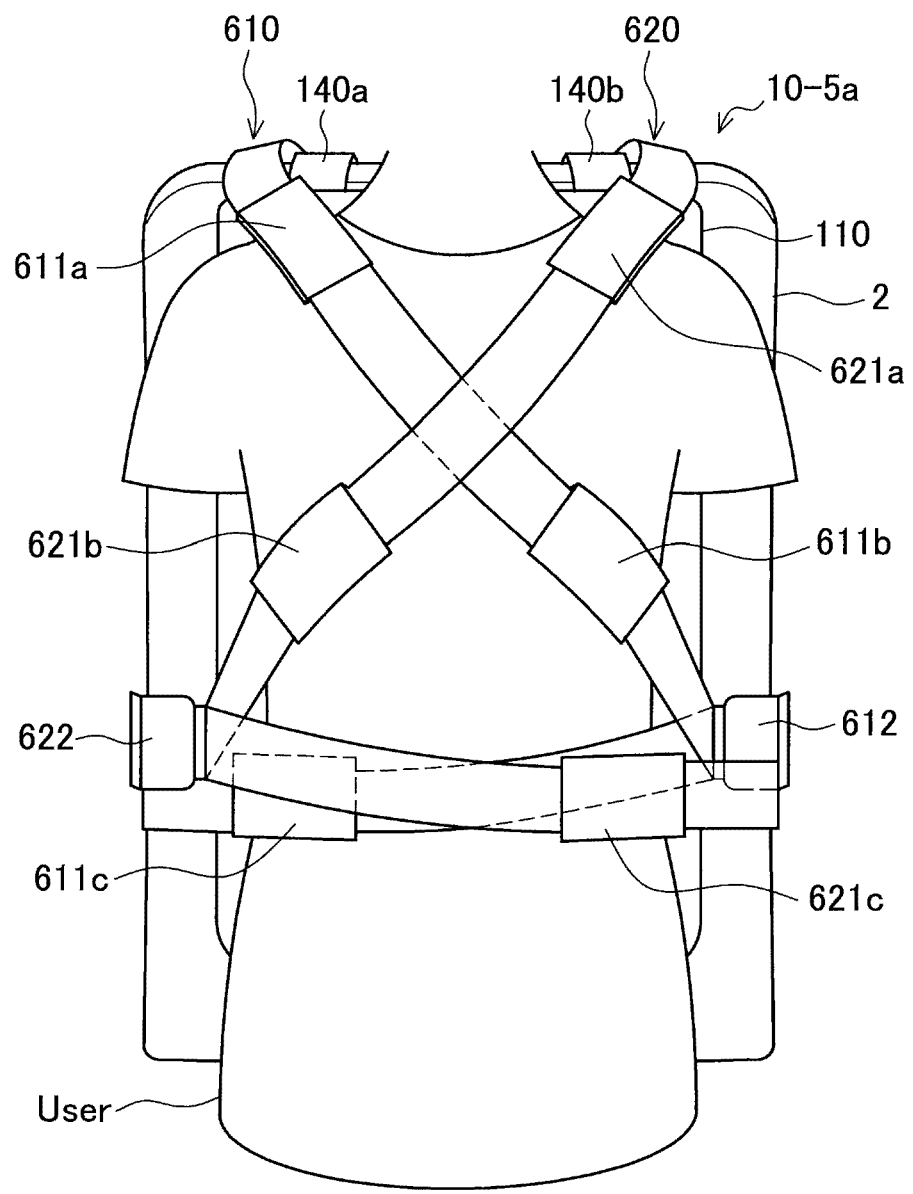
FIG. 19 is a view for explaining a tactile presentation device according to a fifth variation of this embodiment.

FIG. 19 is a view for explaining a tactile Presentation device 10-5a according to the fifth variation of this embodiment. As illustrated in FIG. 19, the tactile presentation device 10-5*a* according to this variation includes a first three-point safety belt 610 (wearing belt) and a second three-point safety belt 620 (wearing belt).

(Configuration)

This variation is an example obtained by modifying the wearing belts 130*a* to 130*d*, 133*a*, and 133*b* (including the attaching/detaching buckles 132 and 134) out of the tactile presentation device 10 according to the above-described embodiment described with reference to FIG. 3, and other configurations are similar. Although not illustrated, the first three-point safety belt 610 and the second three-point safety belt 620 are pulled out from a back surface plate located on a back surface of a chair 2. A safety belt wiring mechanism is provided in the back surface plate.

Furthermore, the first three-point safety belt 610 is provided with a tactile stimulation unit 611*a* brought into contact with the vicinity of shoulder and chest, a tactile stimulation unit 611*b* brought into contact with ribs, and a tactile stimulation unit 611*c* brought into contact with abdomen when the belt is worn. Furthermore, the second three-point safety belt 620 is similarly provided with a tactile stimulation unit 621*a* brought into contact with the vicinity of shoulder and chest, a tactile stimulation unit 621*b* brought into contact with ribs, and a tactile stimulation unit 621*c* brought into contact with a abdomen when the belt is worn.

Each of the variations described above may applied to structures of the tactile stimulation units 611*a* to 611*c* and 621*a* to 621*c*.

The tactile stimulation units 611*a* to 611*c* and 621*a* to 621*c* are preferably arranged so as to make pairs with tactile stimulation units 111*a* to 111*f* provided on a back surface pad 110, respectively, (face substantially horizontally across the body of the user) a in the example described with reference to FIG. 5 at the time of wearing.

(Wearing Method)

When wearing, the user pulls out the first three-point safety belt 610 as a safety belt of a vehicle and mounts an insertion unit (not illustrated, for example, a tongue plate and the like) provided on the first three-point safety belt 610 on an attaching/detaching buckle 612 arranged on a side of the body. Next, the user pulls out the second three-point safety belt 620 and mounts an insertion unit (not illustrated, for example, a tongue plate and the like) provided on the second three-point safety belt 620 on an at aching/detaching buckle 622 arranged on a side of the body (opposite side of the attaching/detaching buckle 612). Note that either the first three-point safety belt 610 or the second three-point safety belt 620 may be worn first. The attaching/detaching buckles 612 and 622 are connected to the back surface plate (not illustrated).

(Effect)

By the description above, the tactile presentation device 10-5*a* according to this variation may be more easily worn without twisting the body at the time of wearing. Furthermore, as in the above-described embodiment, with the tactile presentation device 10-5*a* also, it is possible to press the tactile stimulation unit against the body by the pressure of the safety belt.

(5-4-2. Example of Flipping One Three-Point Safety Belt Vertically)

Figure 20:
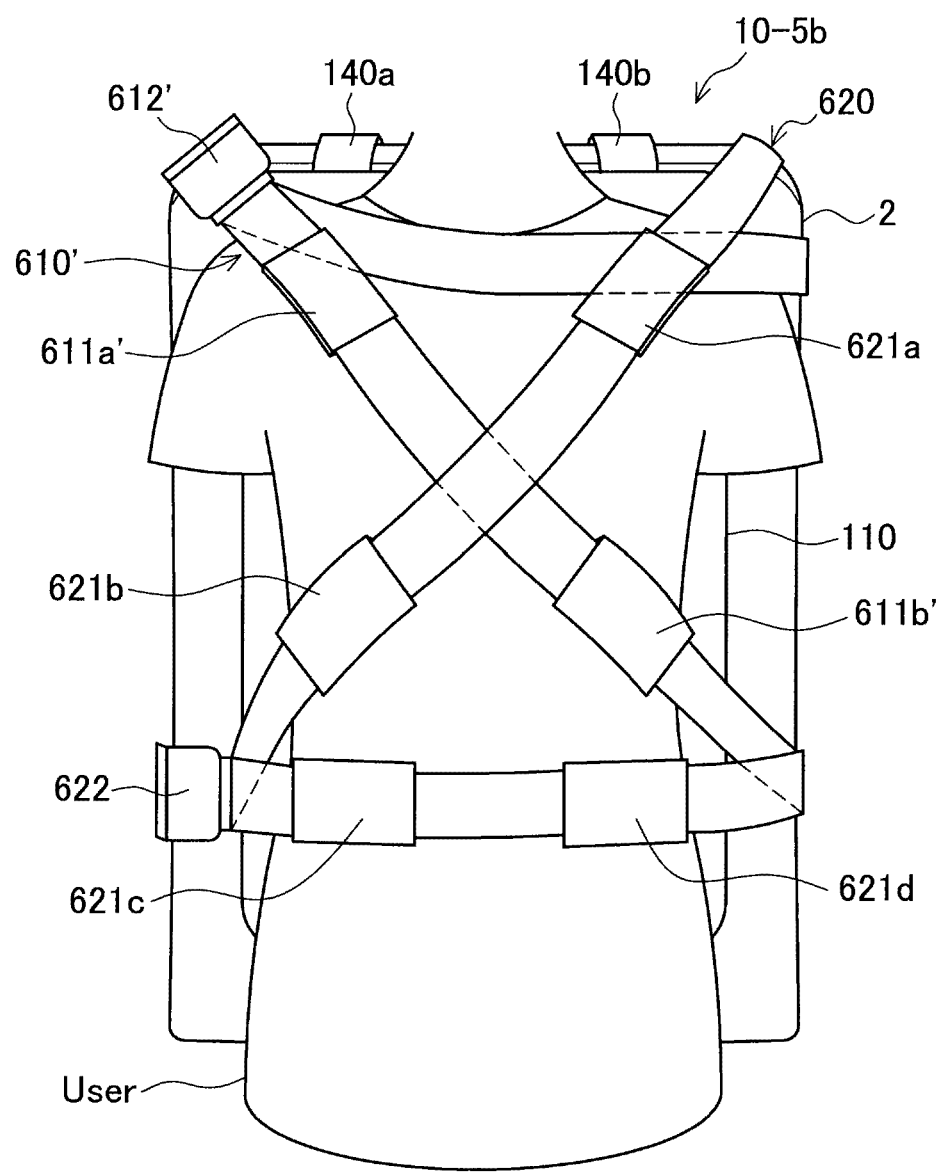
FIG. 20 is a view for explaining a tactile presentation device according to another example the fifth variation of this embodiment.

FIG. 20 is a view for explaining a tactile presentation device 10-5*b* according to another example of the fifth variation. In a case of the tactile presentation device 10-5*a* illustrated in FIG. 19 described above, since the belts on the abdomen are doubled, it is possible to prevent overlap of the belts by flipping one of them vertically.

(Configuration)

Specifically, as illustrated in FIG. 20, for example, a first three-point safety belt 610' obtained by flipping vertically the first three-point safety belt 610 is installed. The first three-point safety belt 610' is provided with a tactile stimulation unit 611*a*' brought into contact with the vicinity of shoulder and chest, and a tactile stimulation unit 611*b*' brought into contact with ribs when the belt is worn.

Furthermore, an attaching/detaching buckle 612' is located above the shoulder. The attaching/detaching buckle 612' is connected to a back surface plate (not illustrated).

Furthermore, the second three-point safety belt 620' is provided with a tactile stimulation unit 621*a* brought into contact with the vicinity of shoulder and chest, a tactile stimulation unit 621*b* brought into contact with ribs, and tactile stimulation unit 621*c* and 621*d* brought into contact with abdomen when the belt is worn.

The tactile stimulation units 611*a*', 611*b*' and 621*a* to 621*d* are preferably arranged so as to make pairs with tactile stimulation units 111*a* to 111*f* provided on a back surface pad 110, respectively, (face substantially horizontally across the body of the user) as in the example described with reference to FIG. 5 at the time of wearing.

(Wearing Method)

When wearing, the user pulls up the first three-point safety belt 610' and mounts an insertion unit (not illustrated, for example, a tongue plate and the like) provided on the first three-point safety belt 610' on an attaching/detaching buckle 612' arranged above the shoulder. Next, the user pulls out the second three-point safety belt 620' and mounts an insertion unit (not illustrated, for example, a tongue plate and the like) provided on the second three-point safety belt 620' on an attaching/detaching buckle 622 arranged on a side of the body. Note that either the first three-point safety belt 610' or the second three-point safety belt 620' may be worn first.

(Effect)

By the description above, the tactile presentation device 10-5*b* according to this variation may be more easily worn without twisting the body at the time of wearing, and the belts are not doubled except an intersecting site. Furthermore, as in the above-described embodiment, with the tactile presentation device 10-5*b* also, it is possible to press the tactile stimulation unit against the body by the pressure of the safety belt.

(5-4-3. Example of Combining Three-Point Safety Belt and Two-Point Safety Belt)

Figure 21:
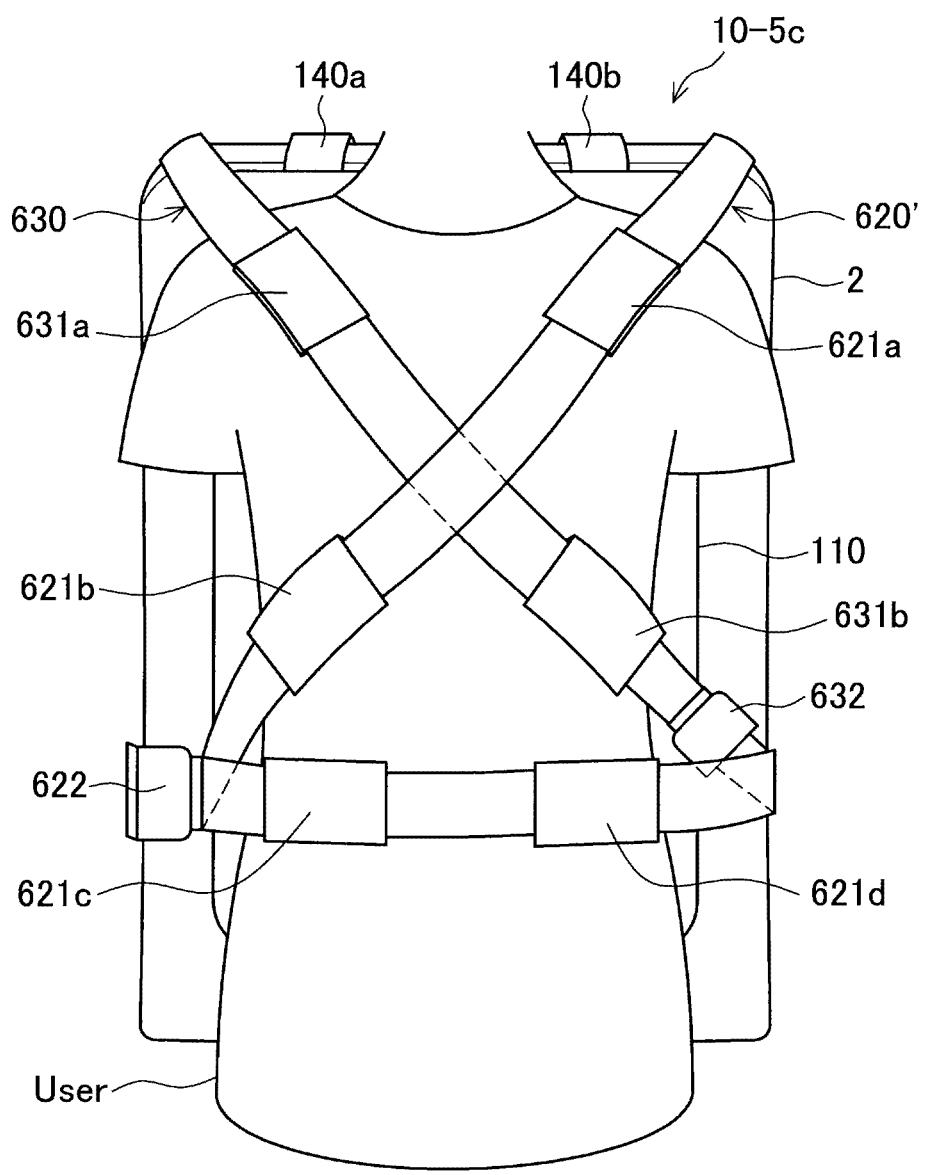
FIG. 21 is a view for explaining a tactile presentation device according to another example of the fifth variation of this embodiment.

FIG. 21 is a view for explaining a tactile presentation device 10-5*c* according to another example of the fifth variation. In a case of the tactile presentation device 10-5*b* illustrated in FIG. 20 described above, it is necessary to pull up the first three-point safety belt 610' and mount the same on the attaching/detaching buckle 612' located above the shoulder, and there is a case where it is difficult to put a force in a pulling operation. Therefore, in the tactile presentation device 10-5*c* according to another example of this variation, by using a two-point safety belt as one of the belts, it becomes possible to wear by an operation to pull down the belt, and eliminate overlap of the belt on the abdomen.

(Configuration)

Specifically, for example, as illustrated in FIG. 21, the tactile presentation device 10-5*c* includes a first two-point safety belt 630 and a second three-point safety belt 620'.

The first two-point safety belt 630 is provided with a tactile stimulation unit 631*a* brought into contact with the vicinity of shoulder and chest, and a tactile stimulation unit 631*b* brought into contact with ribs when the belt is worn. Furthermore, an attaching/detaching buckle 632 is arranged on a side of a body (on a side opposite to an attaching/detaching buckle 622). The attaching/detaching buckle 632 is connected to a back surface plate (not illustrated).

The second three-point safety belt 620' has the configuration similar to that illustrated in FIG. 20 with the same reference sign, so that the details thereof is herein omitted.

The tactile stimulation units 631a, 631b and 621a to 621d are preferably arranged so as to make pairs with tactile stimulation units 111a to 111f provided on a back surface pad 110, respectively, (face substantially horizontally across the body of the user) as in the example described with reference to FIG. 5 at the time of wearing.

(Wearing Method)

When wearing, the user pulls down the first two-point safety belt 630 and mounts an insertion unit (not illustrated, for example, a tongue plate and the like) provided on the first two-point, safety belt 630 on the attaching/detaching buckle 632 arranged on the side of the body. Next, the user pulls out the second three-point safety belt 620' and mounts an insertion unit (not illustrated, for example, a tongue plate and the like) provided on the second three-point safety belt 620' on an attaching/detaching buckle 622 arranged on a side of the body. Note that either the first two-point safety belt 630 or the second three-point safety belt 620' may be worn first.

(Effect)

By the description above, the tactile presentation device 10-5c according to this variation may be more easily worn without twisting the body at the time of wearing, and the belts are not doubled except an intersecting site, and further, this may be worn by an operation of pulling down the belt. Furthermore, by using the two-point safety belt, it is possible to minimize an amount of looseness of the belt in a state in which the buckle is detached. Furthermore, also in the tactile presentation device 10-5c, the tactile stimulation unit may be pressed against the body by the pressure of the safety belt, as in the above-described embodiment.

(5-4-4. Example of Adjusting Position of Tactile Stimulation Unit According to Body Type)

Subsequently, in the fifth variation in which the three-point or two-point safety belt is combined, a configuration example of enabling adjustment of a position of the tactile stimulation unit provided on the belt according to the body type is described with reference to FIG. 22.

Figure 22:
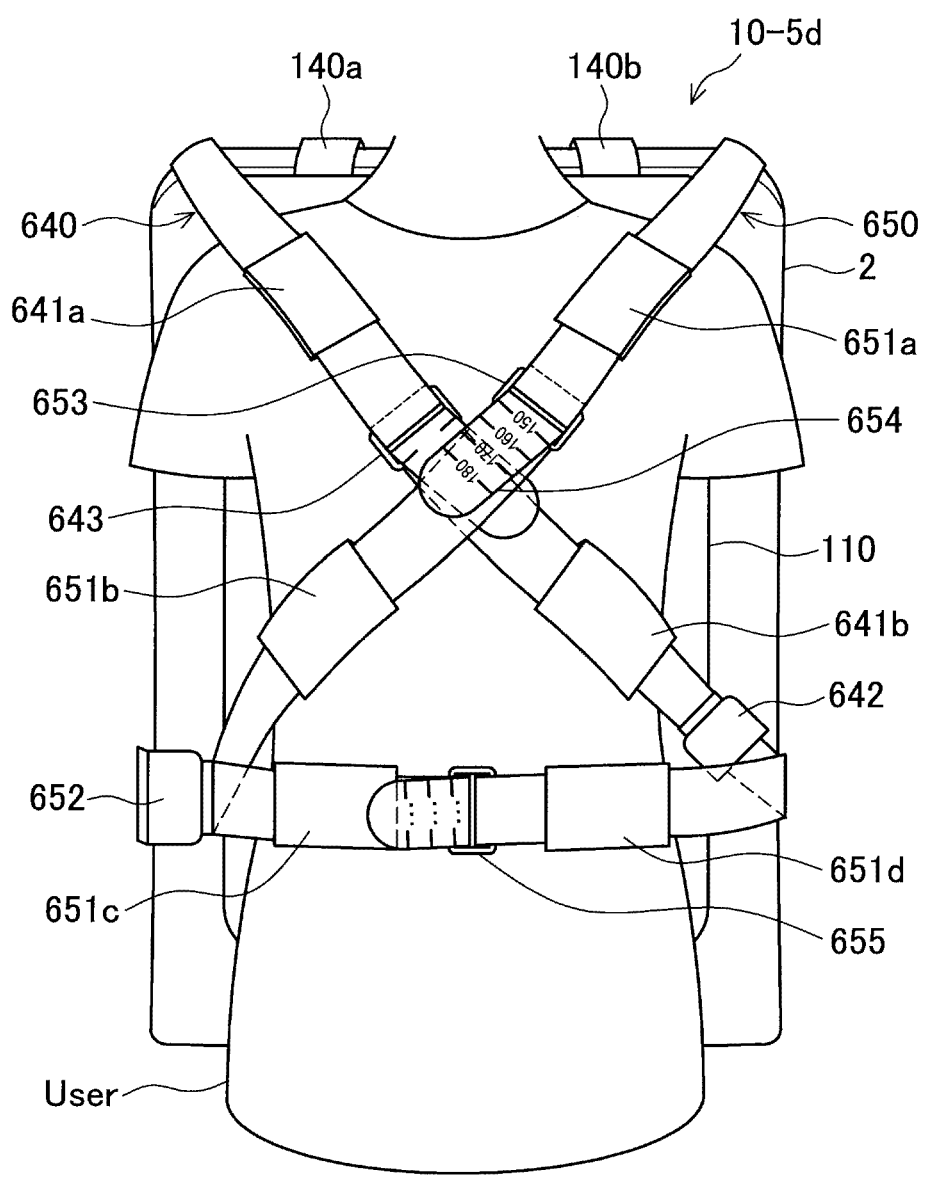
FIG. 22 is a view for explaining a tactile presentation device according to another example of the fifth variation of this embodiment.

FIG. 22 is a view for explaining a tactile presentation device 10-5d according to another example of the fifth variation. In the example illustrated in FIG. 22, a case where an adjusting mechanism according to this variation is provided on the tactile presentation device 10-5c which is an example in which the two-point safety belt is combined described with reference to FIG. 21 is described. A mechanism similar to the adjusting mechanism herein described is also applicable to another tactile presentation device 10 according to this embodiment.

(Configuration)

The tactile presentation device 10-5d includes a first two-point safety belt 640 and a second three-point safety belt 650.

The first two-point safety belt 640 is provided with a tactile stimulation unit 641a brought into contact with the vicinity of shoulder and chest, and a tactile stimulation unit 641b brought into contact with ribs when the belt is worn. Furthermore, an attaching/detaching buckle 642 is arranged on the side of the body (on a side opposite to the attaching/detaching buckle 652). The attaching/detaching buckle 642 is connected to a back surface plate (not illustrated).

The second three-point safety belt 650 provided with a tactile stimulation unit 621a brought into contact with the vicinity of shoulder and chest, a tactile stimulation unit 621b brought into contact with ribs, and tactile stimulation unit 621c and 621d brought into contact with abdomen when the belt is worn. The attaching/detaching buckle 652 is arranged on the side of the body and is connected to the back surface plate (not illustrated).

(Adjusting Method)

The first two-point safety belt 640 and the second three-point safety belt 650 are provided with similar adjusting units 643, 653, and 655. Specifically, between the tactile stimulation unit 641a and the tactile stimulation unit 641b of the first two-point safety belt 640, the adjusting unit 643 is provided, and it is possible to manually adjust a length of the belt. By adjusting the length of the belt, a position of the tactile stimulation unit 641a may be adjusted.

Furthermore, between a tactile stimulation unit 651a and a tactile stimulation unit 651b of the second three-point safety belt 650, the adjusting unit 653 is provided. Similarly, the length of the belt may be manually adjusted, and a position of the tactile stimulation unit 651a may be adjusted.

Furthermore, the adjusting unit 655 is provided between a tactile stimulation unit 651c and a tactile stimulation unit 651d of the second three-point safety belt 650. Similarly, the length of the belt may be manually adjusted, and a position of the tactile stimulation unit 651d may be adjusted.

As illustrated in FIG. 22, for example, the adjusting units 643, 653, and 655 are formed by using, for example, an annular member with which one of the belts may be folded, and the folded belt may be locked by a hook-and-loop fastener and the like. Furthermore, a scale (for example, body height and the like) as a reference for adjustment may be printed on a folded-back portion 654. The user may adjust the length of the belt with reference to the scale (and eventually adjust the position of the tactile stimulation unit). Furthermore, the adjusting units 643, 653, and 655 may be realized by a tape adjuster.

(Effect)

By the description above, it becomes possible to manually adjust the length of the belt after wearing the same to adjust the positions of the tactile stimulation units, thereby adjusting the positions to positions enabling more close adhesion to the body and to appropriate positions making pairs with the tactile stimulation units 111a to 111f provided on the back surface pad 110, respectively.

(5-4-5. Regarding Position of Attaching/Detaching Buckle Arranged on Side of Body)

All of the attaching/detaching buckles 612, 622, 632, 642, and 652 arranged on the side of body in the fifth variation described above are desirably fixed in positions above user's hip, specifically, in the vicinity of flanks such that the tactile stimulation units 611c, 621c, 621d, 651c, and 651d are firmly pressed against the user's abdomen (the belt on the abdomen tends to be displaced downward depending on the body type of the user).

Furthermore, the attaching/detaching buckles 612, 622, 632, 642, and 652 (opening into which the insertion unit is inserted) may be oriented in a direction in which the pressure is wanted to be applied more. For example, the belt on the abdomen tends to be displaced downward depending on the body type of the user, so that the attaching/detaching buckles 612, 622, 632, 642, and 652 may be oriented horizontally (that is, in the direction of the belt on the abdomen) to be fixed in order to firmly press the same against the abdomen.

<5-5. Configuration Example in Which Position of Tactile Stimulation Unit May Be Adjusted>

Figure 23:
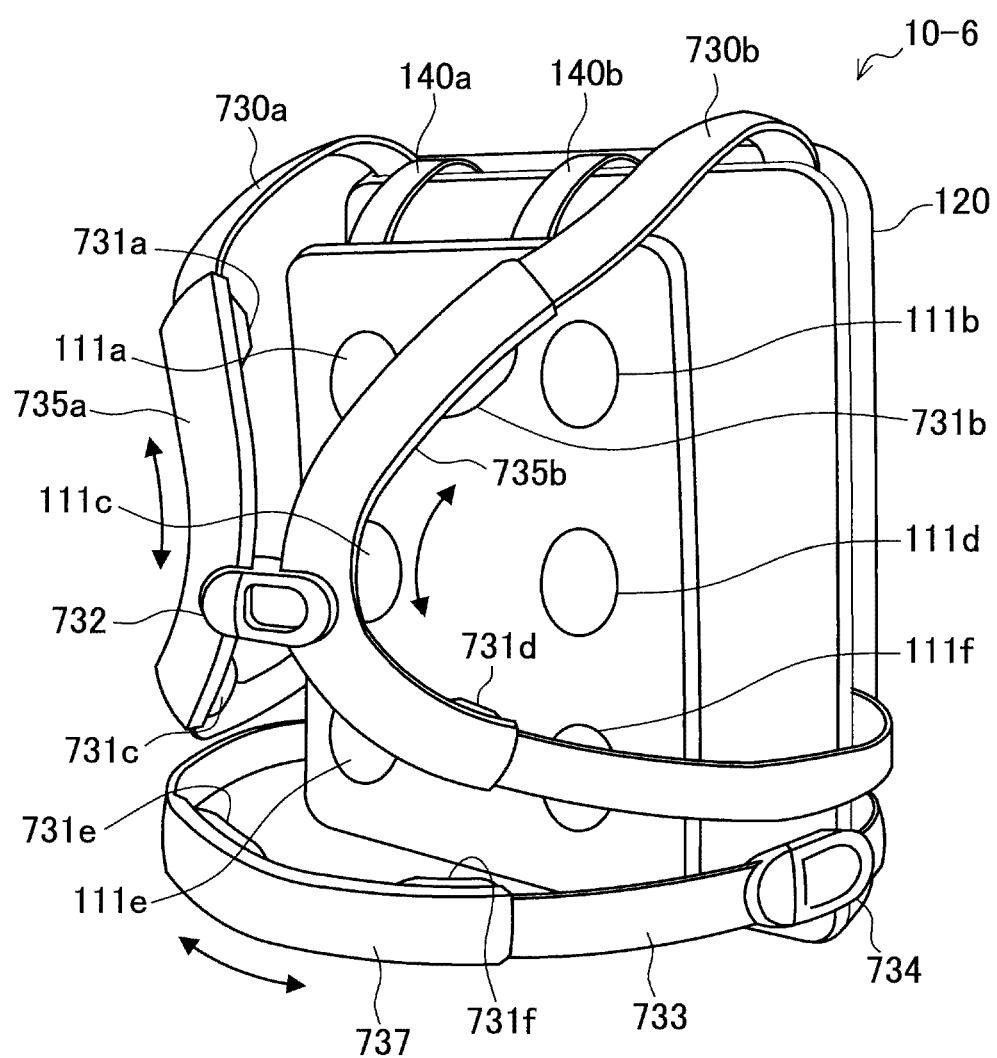
FIG. 23 is a view for explaining a tactile presentation device according to a sixth variation of this embodiment.

Next, as a sixth variation of the tactile presentation device 10, a configuration example in which a position of a tactile stimulation unit may be manually adjusted is described with reference to FIG. 23. FIG. 23 is a view for explaining a tactile presentation device 10-6 according to the sixth variation of this embodiment. Note that in the tactile presentation device 10-6 according to the sixth variation herein described also, control signal for controlling vibration may be input wire or wirelessly.

(Configuration)

As illustrated in FIG. 23, a configuration of the tactile presentation device 10-6 is similar to that of the tactile presentation device 10 illustrated in FIG. 3 in including a back surface pad 110 and a back surface plate 120 and being attached to a chair by interposing a back plate of the chair by them. Furthermore, the back surface pad 110 includes tactile stimulation units 111a to 111f as in the configuration of the tactile presentation device 10 illustrated in FIG. 3.

Furthermore, wearing belts 730a, 730b, and 733 are pulled out from winding units 102 (refer to FIG. provided in the back surface plate 120.

Furthermore, a casing 735a provided with tactile stimulation units 731a and 731c is attached to the wearing belt 730a in a state movable on the belt. Specifically, for example, the wearing belt 730a is configured to penetrate through a through hole formed in the casing 735a. A user may adjust contact positions of the tactile stimulation units 731a and 731c on the body by grasping the casing 735a and moving the same on the belt.

Furthermore, a casing 735b provided with tactile stimulation units 731b and 731d is attached to the wearing belt 730b in a state movable on the belt. Specifically, for example, the wearing belt 730b is configured to penetrate through the through hole formed in the casing 735b. The user may adjust contact positions of the tactile stimulation units 731b and 731d on the body by grasping the casing 735b and moving the same on the belt.

Note that the casings 735a and 735b are formed so as to make an X-shape on the front of user's chest centering on an attaching/detaching buckle 732. The attaching/detaching buckle 732 is separated by, for example, a push button. The user may also move the casing 735a and the casing 735b on the belt in a state in which they are mounted to be integrated by the attaching/detaching buckle 732.

Furthermore, a casing 737 provided with tactile stimulation units 731e and 731f is attached to the wearing belt 733 also in a state movable on the belt. Specifically, for example, the wearing belt 733 is configured to penetrate through a through hole formed in the casing 737. The user may adjust contact positions of the tactile stimulation units 731e and 731f on the body by grasping the casing 737 and moving the same on the belt.

The wearing belt 733 is attached/detached by an attaching/detaching buckle 734. The attaching/detaching buckle 734 is connected to the back surface plate 120.

(Effect)

By the configuration above, the positions of the tactile stimulation units 731a to 731f may be adjusted by the user by moving the casings 735a, 735b, and 737 by himself/herself also at the time of wearing. The positions of the tactile stimulation units 731a to 731f are preferably adjusted to arrangement so as to make pairs with tactile stimulation units 111a to 111f provided on the back surface pad 110 (face substantially horizontally across the body of the user), respectively, as in the example described with reference to FIG. 5.

<5-6. Another Configuration Example of Tactile Presentation Device>

Figure 24:
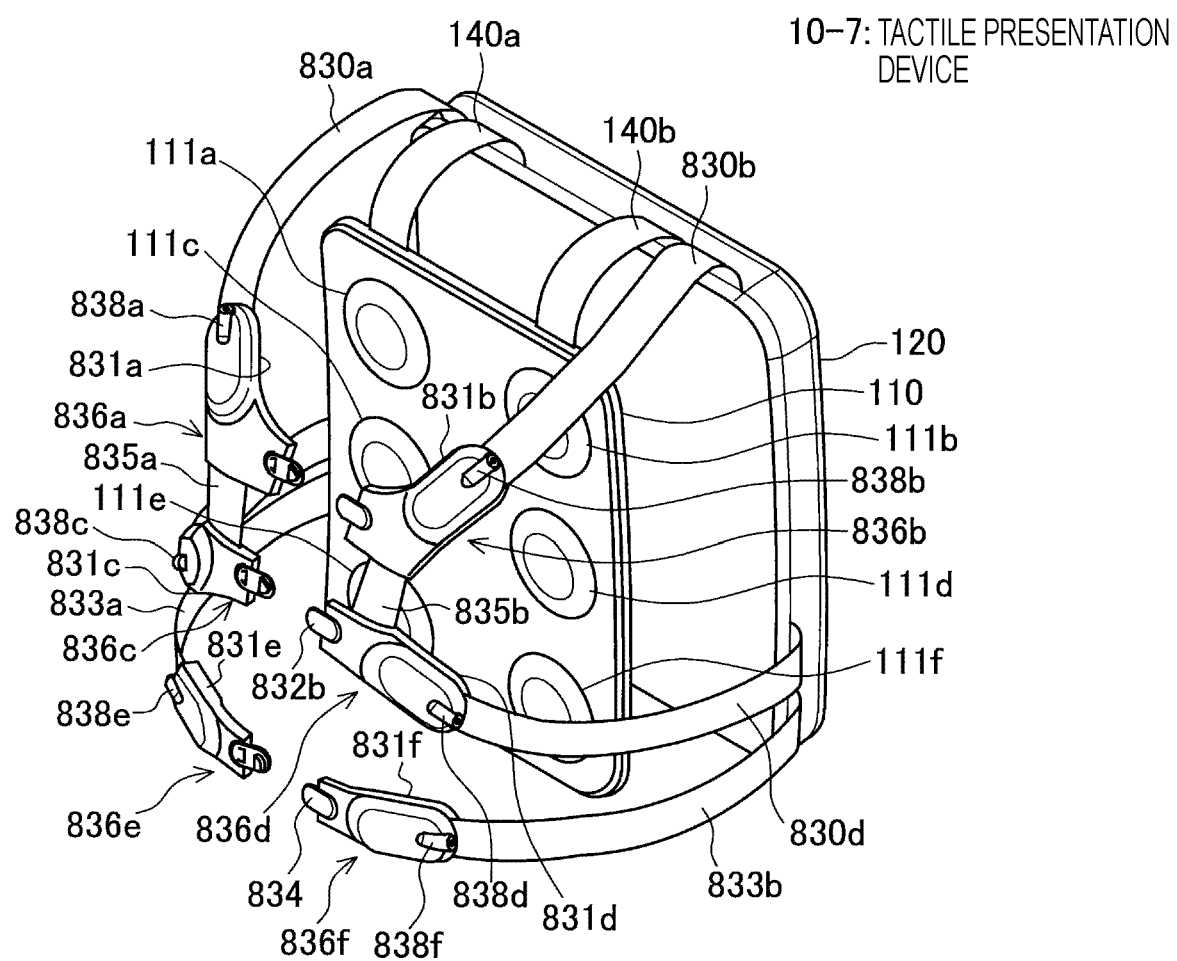
FIG. 24 is a perspective view of a tactile presentation device according to a seventh variation of this embodiment.

Next, a configuration example of a tactile presentation device 10-7 according to a seventh variation of this embodiment is described with reference to FIGS. 24 to 27. FIG. 24 is a perspective view of the tactile presentation device according to the seventh variation of this embodiment.

(Configuration)

As illustrated in FIG. 24, a configuration of the tactile presentation device 10-7 is similar to that of the tactile presentation device 10 illustrated in FIG. 3 in including a back surface pad 110 and a back surface plate 120 and being attached to a chair by interposing a back plate of the chair by them. Furthermore, the back surface pad 110 includes tactile stimulation units 111a to 111f as in the configuration of the tactile presentation device 10 illustrated in FIG. 3.

Wearing belts 830a to 830d, 833a, and 833b pulled out from winding units 102 (refer to FIG. 6) provided in the back surface plate 120 are connected to casings 836a to 836e provided with attaching/detaching buckles 832 and 834 and tactile stimulation units 831a to 831f, respectively. Positions of the tactile stimulation units 831a to 831f are preferably adjusted to arrangement so as to make pairs with tactile stimulation units 111a to 111f provided on the back surface pad 110, respectively, at the time of wearing, as in the example described with reference to FIG. 5.

The casings 836a and 836b are formed so as to make a substantially X-shape on the front of user's chest when the attaching/detaching buckles 832a and 832b are attached.

Furthermore, connection units 838a to 838f provided in the casings 836a to 836e, respectively, are used when a control signal for controlling vibration is input to the tactile stimulation units 831a to 831f by wire. For example, in a case where vibration is controlled using an audio signal, the connection units 838a to 838f may be realized by earphone jacks (audio jacks) to which audio cables may be connected. Note that connection of the tactile presentation device 10-7 according to this variation is not limited to wired connection and may be wireless connection in this case, the tactile presentation device 10-7 may be configured without the connecting units 838a to 838f.

Furthermore, lengths of a belt 835a connecting the casings 836a and 836c and a belt 835b connecting the casings 836h and 836d may be adjusted. This allows the user to adjust the positions of the tactile stimulation units 831a and 831b by himself/herself according to their body types.

Furthermore, the above-described variation may be applied to the structure of each of the tactile stimulation units 831a to 831f.

Figure 25:
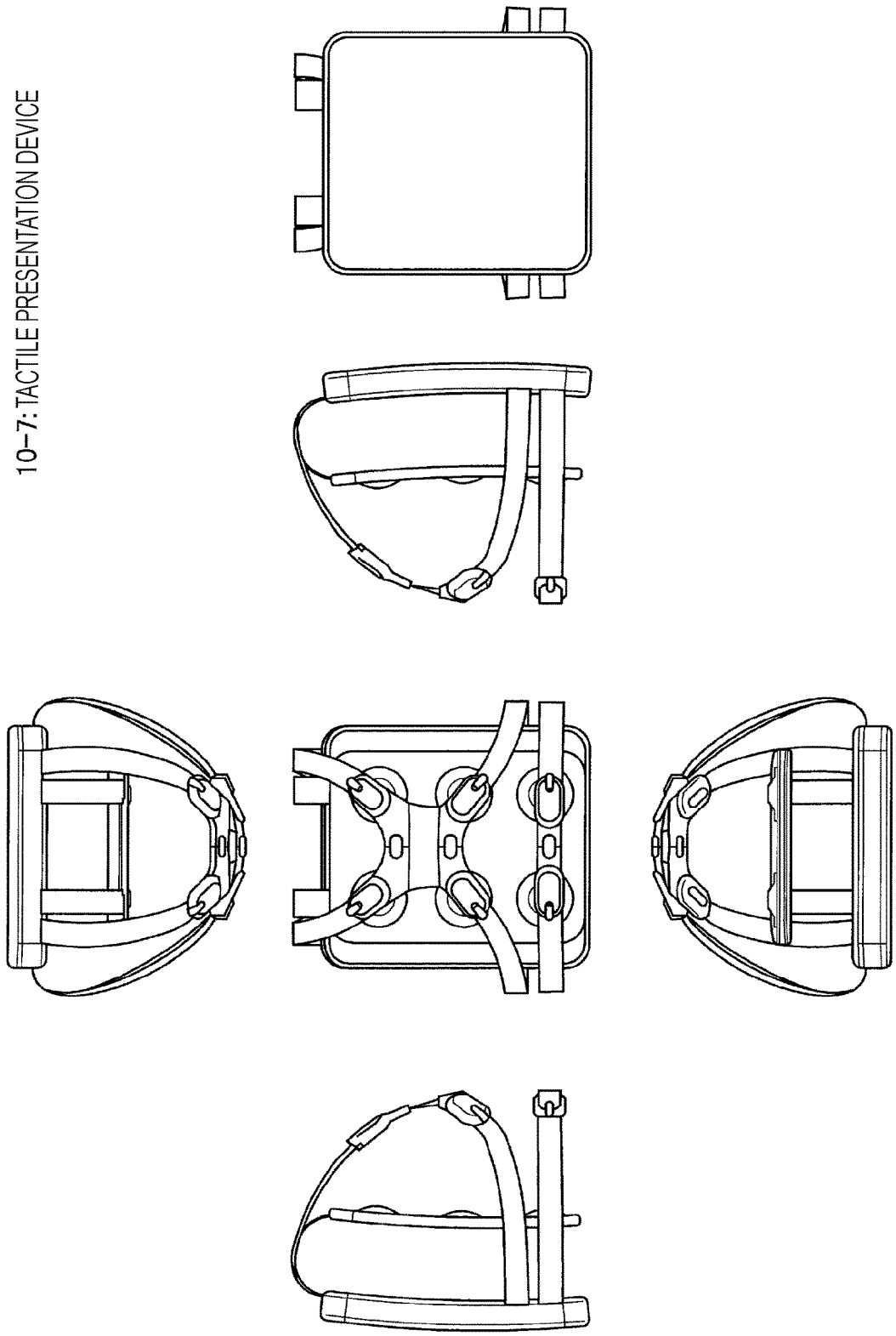
FIG. 25 is six-sided views of the tactile presentation device according to the seventh variation of this embodiment.
Figure 26:
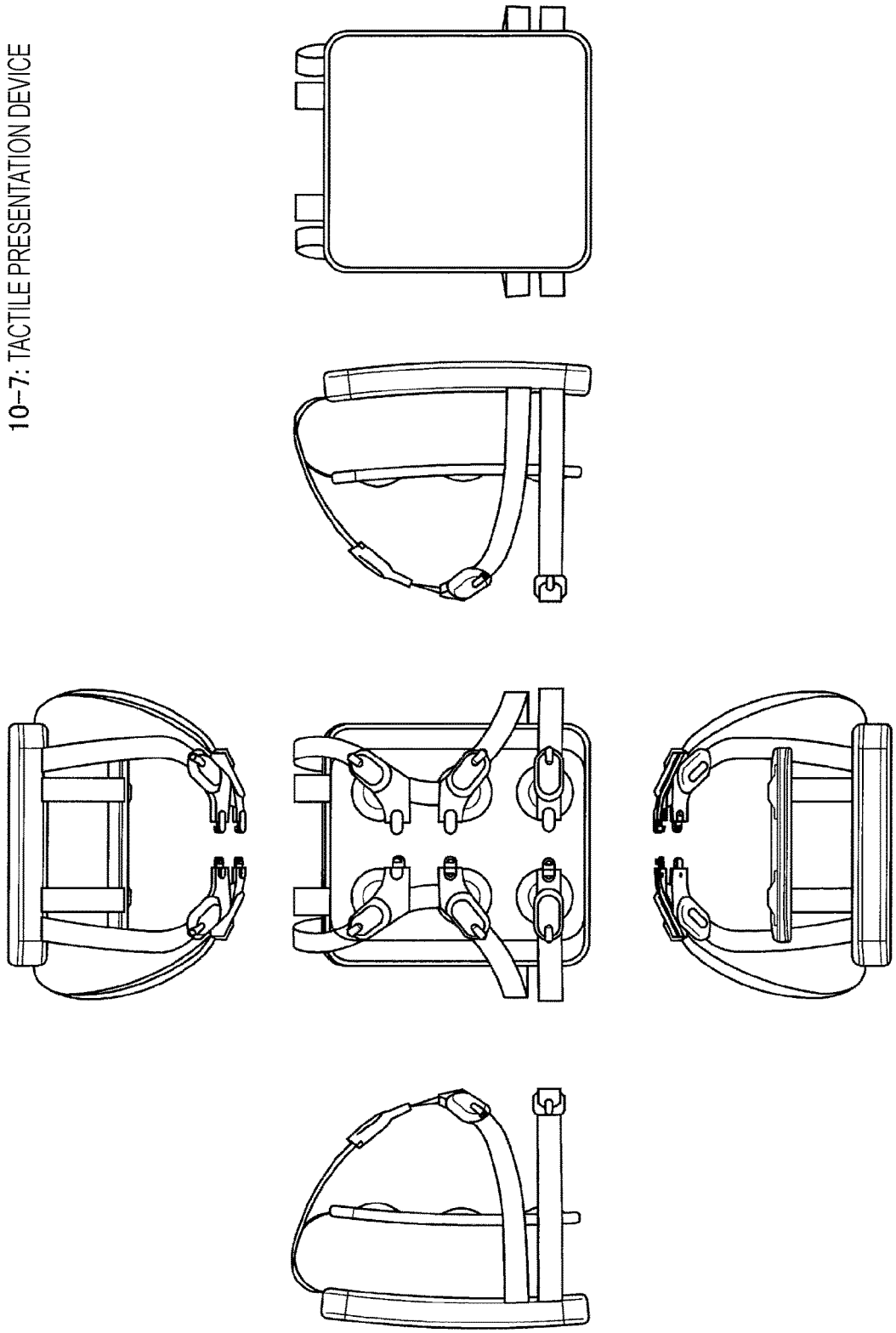
FIG. 26 is six-sided views of the tactile presentation device according to the seventh variation of this embodiment in a state in which a buckle is detached.
Figure 27:
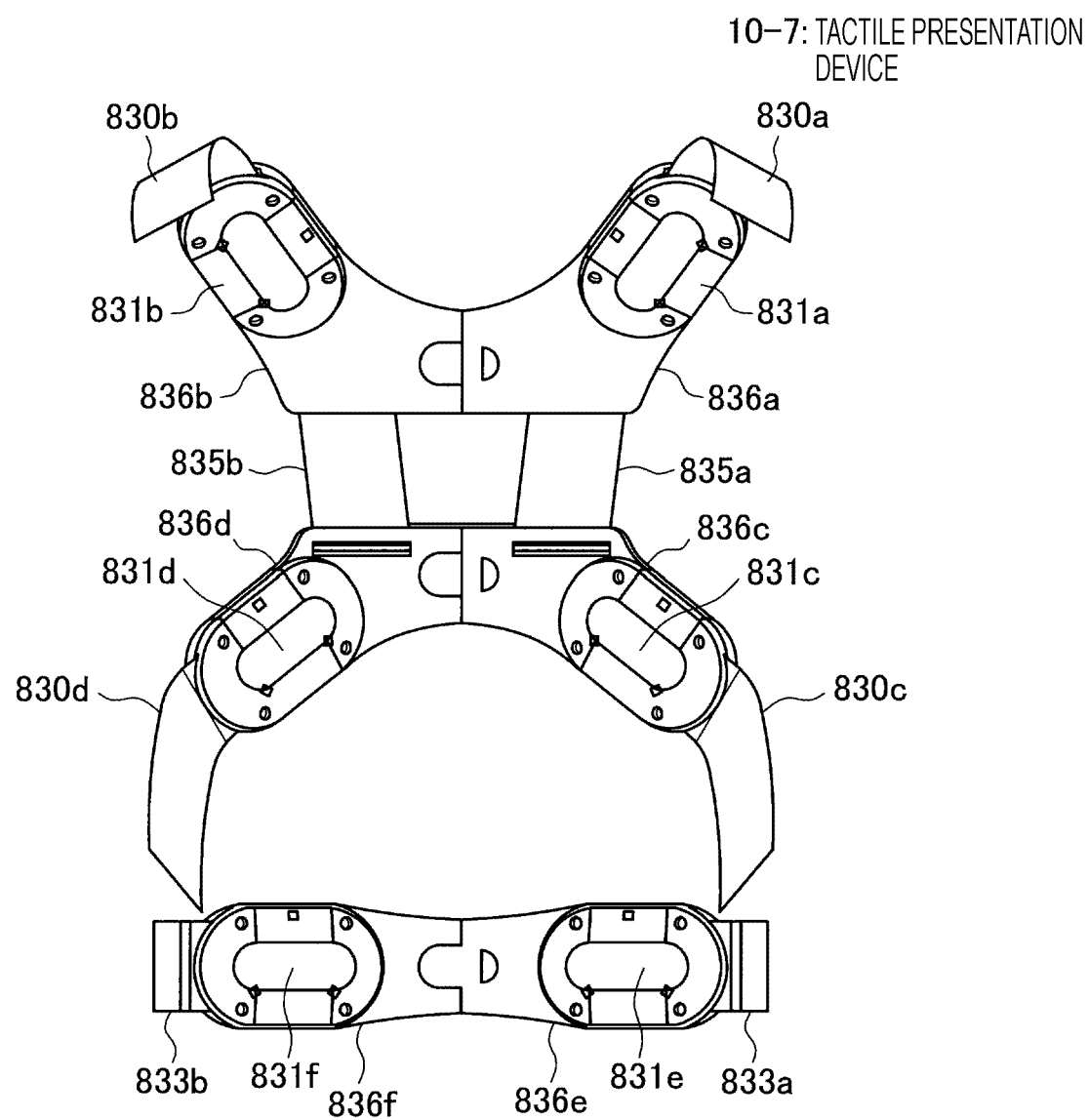
FIG. 27 is a rear view of a casing of the tactile presentation device according to the seventh variation of this embodiment.

FIG. 25 is six-sided views of the tactile presentation device 10-7 according to this variation. Furthermore, FIG. 26 is six-sided views of the tactile presentation device 10-7 according to this variation in a state in which the attaching/detaching buckles 832a, 832b, and 834 are detached. FIG. 27 is a rear view of the casings 836a to 836f of the tactile presentation device 10-7.

(Effect)

In the tactile presentation device 10-7 according to this variation also, it is possible to easily wear the belt, and it is possible to allow the tactile stimulation units 831a to 831f to closely adhere to the body by the pressure of the belt when the belt is worn. <5-7. Another Configuration Example of Tactile Presentation Device>

Figure 28:
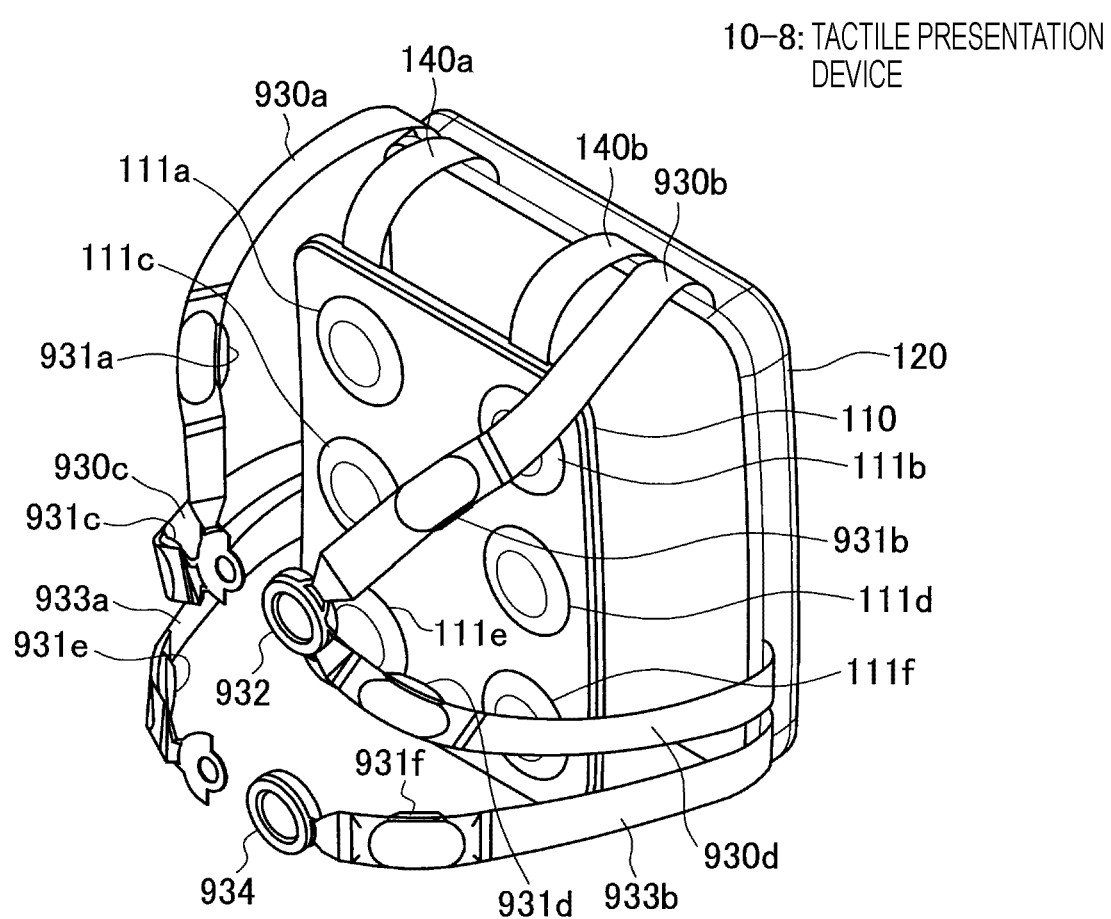
FIG. 28 is a perspective view of a tactile presentation device according to an eighth variation of this embodiment.

Next, a configuration example of a tactile presentation device 10-8 according to an eighth variation of this embodiment is described with reference to FIGS. 28 to 30. FIG. 28 is a perspective view of the tactile presentation device 10-8 according to the eighth variation of this embodiment.

(Configuration)

As illustrated in FIG. 28, a configuration of the tactile presentation device 10-8 is similar to that of tactile presentation device 10 illustrated in FIG. 3 in including a back surface pad 110 and a back surface plate 120 and being attached to a chair by interposing a back plate of the chair by them. Furthermore, the back surface pad 110 includes tactile stimulation units 111a to 111f as in the configuration of the tactile presentation device 10 illustrated in FIG. 3.

Wearing belts 930a to 930d, 933a, and 933b gulled out from winding units 102 (refer to FIG. 6) provided in the back surface plate 120 are provided with tactile stimulation units 931a to 931f, respectively.

Note that in the tactile presentation device 10-8 according to the eighth variation, a control signal for controlling vibration of the tactile stimulation units 111a to 111f and 931a to 931f may be input by wire or wirelessly.

Furthermore, the wearing belts 930a to 930d are provided so as to restrain the front of user's chest in an X-shape centering on an attaching/detaching buckle 932. Furthermore, the wearing belts 933a and 933b are at ached by an attaching/detaching buckle 934.

Furthermore, the wearing belts 930a to 930d, 933a and 938b are rotatably connected to the attaching/detaching buckles 932 and 934. Specifically, for example, the wearing belts 930a to 930d may be rotated (rotationally slid) (manually by the user) horizontally with respect to the attaching/detaching buckle 932 about the center of the attaching/detaching buckle 982.

Positions of the tactile stimulation units 931a to 931f are preferably arranged to positions to make pairs with tactile stimulation units 111a to 111f provided on the back surface pad 110, respectively, at the time or wearing, as in the example described with reference to FIG. 5.

Furthermore, the above-described variation may be applied to the structure of each of the tactile stimulation units 931a to 931f.

Figure 29:
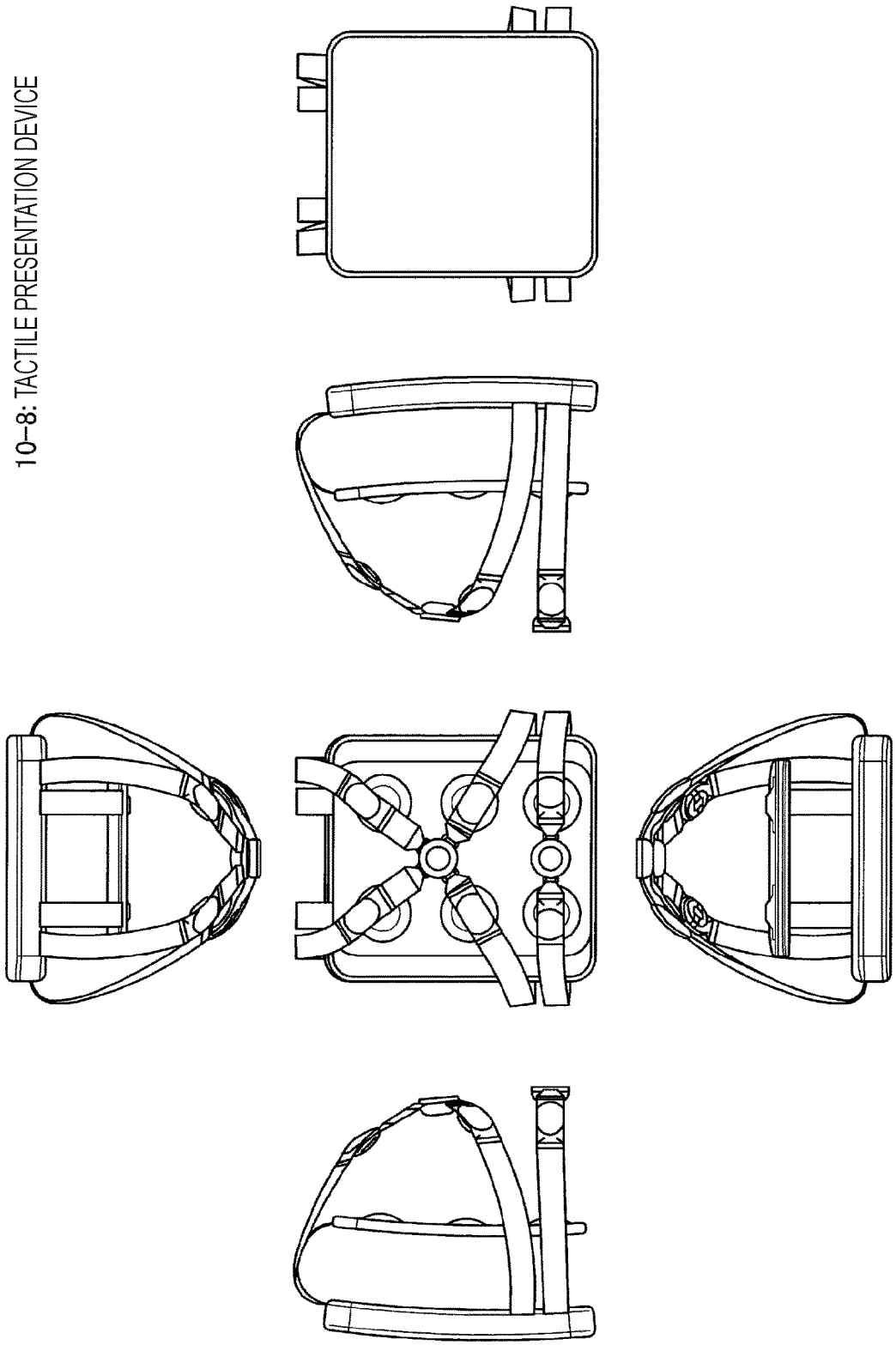
FIG. 29 is a six-sided view of the tactile presentation device according to the eighth variation of this embodiment.
Figure 30:
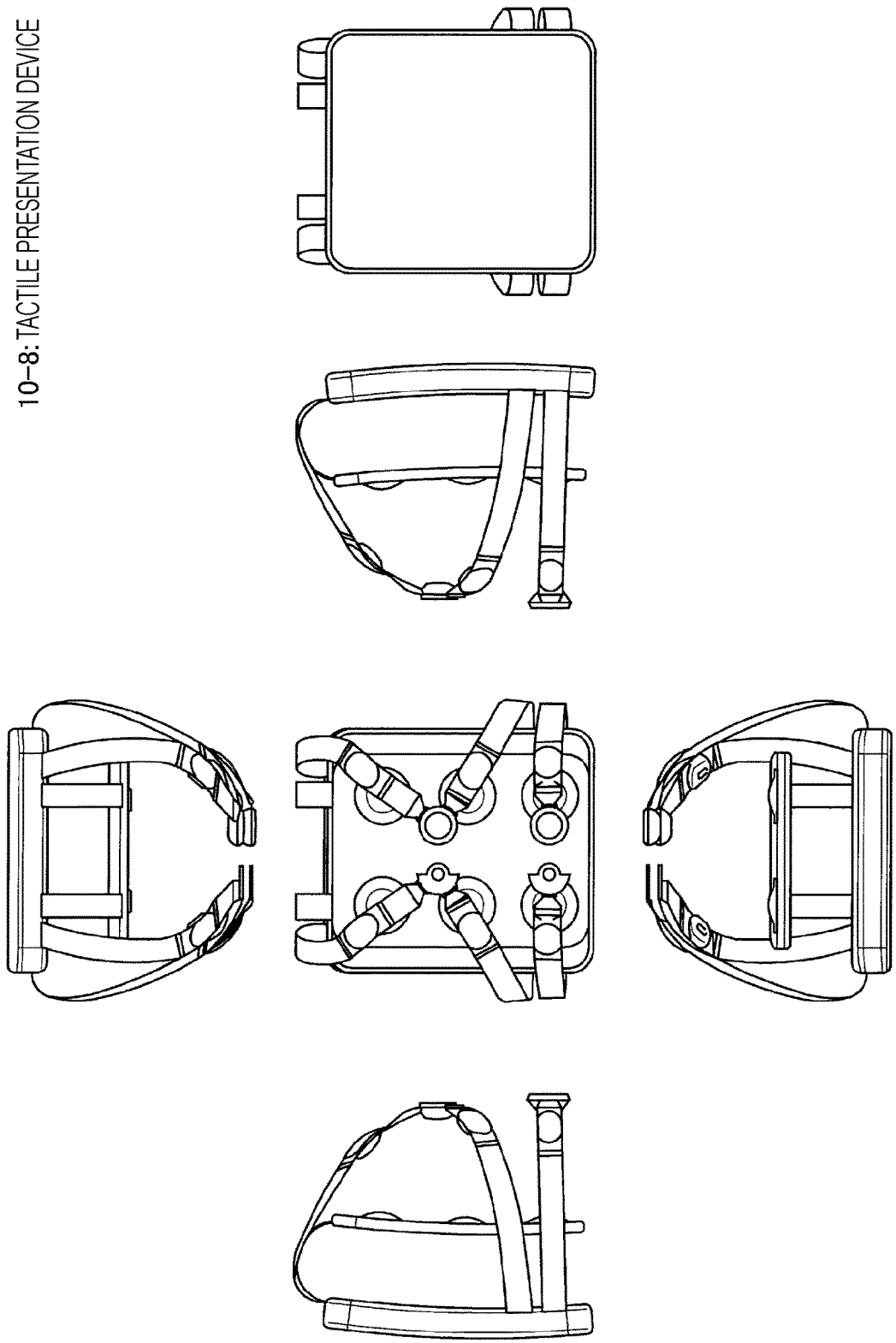
FIG. 30 is six-sided views of the tactile presentation device according to the eighth variation of this embodiment in a state in which a buckle is detached.

FIG. 29 is six-sided views of the tactile presentation device 10-8 according to this variation. Furthermore, FIG. 30 is six-sided views of the tactile presentation device 10-8 according to this variation in a state in which the attaching/detaching buckles 932 and 934 are detached.

(Effect)

In the tactile presentation device 10-8 according to this variation also, it is possible to easily wear the belt, and it is possible to allow the tactile stimulation units 931a to 931f to closely adhere to the body by the pressure of the belt when the belt is worn.

«6. Summary»

As described above, an information processing system according to the embodiment of the present disclosure realizes easier wearing/removal and contact of the tactile stimulation unit at the appropriate position.

Although the preferred embodiment of the present disclosure is described above in detail with reference to the attached drawings, the present technology is not limited to such examples. It is clear that one of ordinary skill in the technical field of the present disclosure may conceive of various modifications and corrections within the scope of the technical idea recited in claims and it is understood that they also naturally belong to the technical scope of the present disclosure.

For example, in the above-described embodiment, as illustrated in FIG. 3, the tactile presentation device 10 configured to be attachable to/detachable from the back plate of the existing chair is described, but this embodiment is not limited to this. For example, the tactile presentation device 10 may configured integral with the chair such that an internal configuration of the back surface plate 120 illustrated FIG. 6 is provided in advance on the back plate portion (in the back plate) of the chair, and the wearing belt is directly pulled out from the back plate of the chair. Alternatively, the tactile presentation device 10 according to the embodiment may be a suspender type tactile present at on device. That is, it is possible to provide one or more tactile stimulation units on a belt forming a suspender and present the tactile stimulus to the body in a state in which the suspender is worn. At that time, tension of the belt of the suspender makes it possible to press the tactile stimulation unit against the body at an appropriate pressure. Furthermore, the belt of the suspender may have an extendable/contractable structure. Furthermore, it is also possible to allow the user to perceive the tactile effect in the body and move the perceptual position of the tactile effect in the body by linking a plurality of tactile stimulation units located in positions facing each other across the body (for example, a tactile stimulation unit provided on a belt located on the front of the body and a tactile stimulation unit provided on the belt (or backrest and the like) located on the back of the body.

Furthermore, an external shape of each configuration of the tactile presentation device 10 in the above-described embodiment or variation is not limited to the illustrated example. For example, the shape of the back surface plate 120 and the back surface pad 110 is not limited to a rectangle, and may be a circle, a shape including a curved line, straight line, or a curved surface.

Furthermore, a computer program for allowing hardware such as a CPU, a ROM, and a RAM incorporated in the tactile presentation device 10 or the reproduction control device 20 described above to exert functions of the tactile presentation device 10 or the reproduction control device 20 may also be created. Furthermore, a computer-readable storage medium that stores the computer program is also provided.

Furthermore, the effects described in this specification are merely illustrative or exemplary, and are not limiting. That is, the technology according to the present disclosure may exhibit other effects obvious to those skilled in the art from the description of this specification together with or in place of the effects described above.

Note that the present technology may also have following configurations.

(1)

A tactile presentation device provided with:
an attaching unit to a back plate of a chair; and
a wearing belt portion to a body provided so as to be extendable and contractable on the at aching unit,
in which one or more first tactile stimulation units are provided on the attaching unit, and
one or more second tactile stimulation units are provided on the wearing belt portion.

(2)

The tactile presentation device according to (1) described above, in which the one or more first tactile stimulation units and the one or more second tactile stimulation units are arranged so as to face each other across the body.

(3)

The tactile presentation device according to (1) or (2) described above, in which the wearing belt portion includes
two first wearing belts pulled out from both sides in an upper portion of the attaching unit,
two second wearing belts pulled out from both sides in a lower portion of the attaching unit, and
one buckle that attaches and detaches the two first wearing belts and the two second wearing belts.

(4)

The tactile presentation device according to (3) described above, in which the wearing belt portion further includes
two third wearing belts pulled out from both the sides in the lower portion of the attaching unit, and one buckle that attaches and detaches the two third wearing belts.

(5)

The tactile presentation device according to any one of (1) to (3) described above, in which the second tactile stimulation unit is pressed against the body by tension of the wearing belt portion.

(6)

The tactile presentation device according to any one of (1) to (5) described above, in which the one or more second tactile stimulation units are movably provided on the wearing belt portion.

(7)

The tactile presentation device according to (2) described above, in which the number of the one or more first tactile stimulation units and the number of the one or more second tactile stimulation units are the same.

(8)

The tactile presentation device according to any one of (1) to (7) described above, in which the attaching unit includes
members that sandwich the back plate,
among the members, on a first back surface member located on a front surface of the back plate, the one or more first tactile stimulation units are provided, and
the wearing belt portions are pulled out from a second back surface member located on a rear surface of the back plate.

(9)

The tactile presentation device according to described above, in which an adjusting belt that adjusts a height of the first back surface member is provided on the first back surface member, and
the adjusting belt extends and contracts according to extension and contraction of two first wearing belts pulled out from both sides in an upper portion of the second back surface member.

(10)

The tactile presentation device according to any one of (1) to (9) described above, further provided with:
a control unit that controls in a linked manner tactile stimulus outputs from the first tactile stimulation unit and the second tactile stimulation unit.

(11)

The tactile presentation device according to (8) or (9) described above, in which the wearing belt portion includes
a two-point wearing belt pulled out from either right or left side of the second back surface member and is attached to and detached from a first buckle arranged in a lower portion on an opposite side, and
a three-point wearing belt pulled out from the side opposite to the side from which the two-point wearing belt is pulled out of the second back surface member and is attached to and detached from a second buckle arranged in a lower portion on the side from which wo-point wearing belt is pulled out.

(12)

The tactile presentation device according to (11) described above, in which the wearing belt portion includes an adjusting unit that is located between a plurality of the second tactile stimulation units provided on the wearing belt portion and adjusts a length of the belt.

(13)

A tactile presentation device provided with:
a seating face;
a back plate;
a wearing belt portion to a body provided so as to be extendable and contractable on the back plate; and
a back surface member arranged on a front surface of the back plate,
in which one or more first tactile stimulation units are provided on the back surface member arranged on the front surface of the back plate, and
one or more second tactile stimulation units are provided on the wearing belt portion.

REFERENCE SIGNS LIST 10 (10-1 to 10-8) Tactile presentation device
20 Reproduction control device
100 Control unit
101 Control device
102 winding unit
103 Power cable
110 Back surface pad
111 (111a to 111f) Tactile stimulation unit
120 Back surface plate
130, 133, 730, 830, 930 Wearing belt
131, 611, 621, 631, 641, 731, 831, 931 Tactile stimulation unit
132, 134, 612, 622, 632, 642, 652, 732, 734, 832, 834, 932, 934 Attaching/detaching buckle
140 Adjusting belt
150 Fixing belt
160 Communication unit
610 First three-point safety belt (wearing belt)
620 Second three-point safety belt (wearing belt)
630 First two-point safety belt (wearing belt)
640 First two-point safety belt (wearing belt)
650 Second three-point safety belt (wearing belt)
653 Adjusting unit
735, 737 Casing
836a to 836e Casing

The invention claimed is:

1. A tactile presentation device comprising:
an attaching unit to a back plate of a chair; and
a wearing belt portion to a body provided so as to be extendable and contractable on the attaching unit,
wherein one or more first tactile stimulation units are provided on the attaching unit, wherein one or more second tactile stimulation units are provided on the wearing belt portion, and wherein the wearing belt portion includes two first wearing belts pulled out from both sides in an upper portion of the attaching unit, two second wearing belts pulled out from both sides in a lower portion of the attaching unit, and one buckle that attaches and detaches the two first wearing belts and the two second wearing belts.

2. The tactile presentation device according to claim 1, wherein the one or more first tactile stimulation units and the one or more second tactile stimulation units are arranged so as to face each other across the body.

3. The tactile presentation device according to claim 2, wherein the number of the one or more first tactile stimulation units and the number of the one or more second tactile stimulation units are the same.

4. The tactile presentation device according to claim 1, wherein the wearing belt portion further includes two third wearing belts pulled out from both the sides in the lower portion of the attaching unit, and one buckle that attaches and detaches the two third wearing belts.

5. The tactile presentation device according to claim 1, wherein the second tactile stimulation unit is pressed against the body by tension of the wearing belt portion.

6. The tactile presentation device according to claim 1, wherein the one or more second tactile stimulation units are movably provided on the wearing belt portion.

7. The tactile presentation device according to claim 1, further comprising:

a control unit that controls in a linked manner tactile stimulus outputs from the first tactile stimulation unit and the second tactile stimulation unit.

8. A tactile presentation device comprising:

an attaching unit to a back plate of a chair; and a wearing belt portion to a body provided so as to be extendable and contractable on the attaching unit, wherein one or more first tactile stimulation units are provided on the attaching unit, wherein one or more second tactile stimulation units are provided on the wearing belt portion, and wherein the attaching unit includes members that sandwich the back plate, among the members, on a first back surface member located on a front surface of the back plate, the one or more first tactile stimulation units are provided, and the wearing belt portions are pulled out from a second back surface member located on a rear surface of the back plate.

9. The tactile presentation device according to claim 8, wherein an adjusting belt that adjusts a height of the first back surface member is provided on the first back surface member, and the adjusting belt extends and contracts according to extension and contraction of two first wearing belts pulled out from both sides in an upper portion of the second back surface member.

10. The tactile presentation device according to claim 9, wherein the wearing belt portion includes a two-point wearing belt pulled out from either right or left side of the second back surface member and is attached to and detached from a first buckle arranged in a lower portion on an opposite side, and a three-point wearing belt pulled out from the side opposite to the side from which the two-point wearing belt is pulled out of the second back surface member and is attached to and detached from a second buckle arranged in a lower portion on the side from which the two-point wearing belt is pulled out.

11. The tactile presentation device according to claim 8, wherein the wearing belt portion includes a two-point wearing belt pulled out from either right or left side of the second back surface member and is attached to and detached from a first buckle arranged in a lower portion on an opposite side, and a three-point wearing belt pulled out from the side opposite to the side from which the two-point wearing belt is pulled out of the second back surface member and is attached to and detached from a second buckle arranged in a lower portion on the side from which the two-point wearing belt is pulled out.

12. The tactile presentation device according to claim 11, wherein the wearing belt portion includes an adjusting unit that is located between a plurality of the second tactile stimulation units provided on the wearing belt portion and adjusts a length of the belt.

13. A tactile presentation device comprising:

a seating face;

a back plate;

a wearing belt portion to a body provided so as to be extendable and contractable on the back plate; and a back surface member arranged on a front surface of the back plate, wherein one or more first tactile stimulation units are provided on the back surface member arranged on the front surface of the back plate, wherein one or more second tactile stimulation units are provided on the wearing belt portion, and wherein the wearing belt portion includes two first wearing belts pulled out from both sides in an upper portion of the back plate, two second wearing belts pulled out from both sides in a lower portion of the back plate, and one buckle that attaches and detaches the two first wearing belts and the two second wearing belts.

\* \* \* \* \*